(12) United States Patent
Yamauchi et al.

(10) Patent No.: US 12,545,836 B2
(45) Date of Patent: *Feb. 10, 2026

(54) FLUORIDE PHOSPHOR AND METHOD OF PRODUCING THE SAME, WAVELENGTH CONVERSION MEMBER, AND LIGHT EMITTING DEVICE

(71) Applicant: NICHIA CORPORATION, Anan (JP)

(72) Inventors: Yohei Yamauchi, Tokushima (JP); Tomokazu Yoshida, Anan (JP); Yuki Shiota, Tokushima (JP)

(73) Assignee: NICHIA CORPORATION, Anan (JP)

( * ) Notice: Subject to any disclaimer, the term of this patent is extended or adjusted under 35 U.S.C. 154(b) by 829 days.

This patent is subject to a terminal disclaimer.

(21) Appl. No.: 17/807,845

(22) Filed: Jun. 20, 2022

(65) Prior Publication Data

US 2022/0403236 A1 Dec. 22, 2022

(30) Foreign Application Priority Data

Jun. 21, 2021 (JP) .................................. 2021-102681
Jun. 1, 2022 (JP) .................................. 2022-089664

(51) Int. Cl.
*C09K 11/61* (2006.01)
*C09K 11/02* (2006.01)
*C09K 11/64* (2006.01)
*H10H 20/851* (2025.01)

(52) U.S. Cl.
CPC ............ *C09K 11/617* (2013.01); *C09K 11/02* (2013.01); *C09K 11/646* (2013.01); *H10H 20/8512* (2025.01)

(58) Field of Classification Search
CPC ..... C09K 11/617; C09K 11/025; C09K 11/02; C09K 11/616; C09K 11/646; H10H 20/8512; H10H 20/0361; H10H 20/8514
See application file for complete search history.

(56) References Cited

U.S. PATENT DOCUMENTS

| | | | |
|---|---|---|---|
| 7,235,190 | B1 | 6/2007 | Wilcoxon et al. |
| 9,658,489 | B1 | 5/2017 | Lee et al. |
| 10,563,122 | B2 | 2/2020 | Kuwabata et al. |
| 11,643,595 | B2 * | 5/2023 | Shiota ............... B32B 17/06 362/84 |
| 2006/0040103 | A1 | 2/2006 | Whiteford et al. |
| 2008/0118755 | A1 | 5/2008 | Whiteford et al. |
| 2008/0238294 | A1 | 10/2008 | Xu et al. |
| 2009/0020221 | A1 | 1/2009 | Yamazaki et al. |
| 2012/0032219 | A1 | 2/2012 | Ooyabu et al. |
| 2012/0113672 | A1 | 5/2012 | Dubrow et al. |
| 2012/0256125 | A1 | 10/2012 | Kaneyoshi et al. |
| 2013/0070443 | A1 | 3/2013 | Pan et al. |
| 2013/0264937 | A1 | 10/2013 | Sakuta et al. |
| 2014/0275598 | A1 | 9/2014 | Freeman et al. |
| 2015/0008463 | A1 | 1/2015 | Yoshida |
| 2015/0184067 | A1 | 7/2015 | Kajikawa et al. |
| 2015/0263245 | A1 | 9/2015 | Akagawa et al. |
| 2015/0291879 | A1 | 10/2015 | Hong et al. |
| 2015/0361335 | A1 | 12/2015 | Murphy et al. |
| 2016/0087164 | A1 | 3/2016 | Kawano et al. |
| 2016/0289553 | A1 | 10/2016 | Beers et al. |
| 2016/0376498 | A1 | 12/2016 | Qiu |
| 2016/0376499 | A1 | 12/2016 | Setlur et al. |
| 2017/0066964 | A1 | 3/2017 | Kaneyoshi et al. |
| 2017/0073392 | A1 | 3/2017 | Arntz et al. |
| 2017/0107425 | A1 | 4/2017 | Kaneyoshi et al. |
| 2017/0137707 | A1 | 5/2017 | Jin et al. |
| 2017/0153382 | A1 | 6/2017 | Wang et al. |
| 2017/0155020 | A1 | 6/2017 | Lin et al. |
| 2017/0210982 | A1 | 7/2017 | Yoshida |
| 2017/0283695 | A1 | 10/2017 | Yoshida et al. |
| 2018/0120492 | A1 | 5/2018 | Lee et al. |
| 2018/0142147 | A1 | 5/2018 | Niimi |
| 2018/0163126 | A1 | 6/2018 | Murphy et al. |
| 2018/0208840 | A1 | 7/2018 | Lüchinger et al. |
| 2018/0240944 | A1 | 8/2018 | Yoshimura et al. |
| 2018/0298278 | A1 | 10/2018 | Zhong et al. |
| 2019/0136128 | A1 | 5/2019 | Murphy et al. |
| 2019/0153313 | A1 | 5/2019 | Lüchinger et al. |
| 2019/0237634 | A1 * | 8/2019 | Nakabayashi ....... H10H 20/856 |
| 2019/0241799 | A1 * | 8/2019 | Kaneyoshi ........... C09K 11/617 |
| 2019/0305193 | A1 | 10/2019 | Aoyagi et al. |
| 2020/0392402 | A1 | 12/2020 | Lüchinger et al. |
| 2021/0238477 | A1 | 8/2021 | Butendeich et al. |
| 2021/0363422 | A1 | 11/2021 | Nikata et al. |
| 2021/0384385 | A1 | 12/2021 | Nojima et al. |
| 2024/0279543 | A1 | 8/2024 | Yoshida |

FOREIGN PATENT DOCUMENTS

| | | |
|---|---|---|
| CN | 105623656 A | 6/2016 |
| CN | 107541206 A | 1/2018 |

(Continued)

OTHER PUBLICATIONS

Loredana Protesescu et al., University of Electro-Communication. "Nanocrystals of Cesium Lead Halide Perovskites ($CsPbX_3$, X=Cl, Br, and I): Novel Optoelectronic Materials Showing Bright Emission with Wide Color Gamut," Jan. 29, 2015, 14 pages.

*Primary Examiner* — Matthew E. Hoban
*Assistant Examiner* — Lynne Edmondson
(74) *Attorney, Agent, or Firm* — Hunton Andrews Kurth LLP

(57) ABSTRACT

A fluoride phosphor, comprising fluoride particles having an average particle size of 0.1 μm to 7 μm and a maximum particle size of 1 μm to 18 μm, wherein a ratio of the maximum particle size with respect to the average particle size is higher than 1. The fluoride particles have a composition containing an element M containing at least one selected from the group consisting of Group 4 elements, Group 13 elements, and Group 14 elements; an alkali metal; Mn; and F. In the composition, when the number of moles of the alkali metal is 2, the number of moles of Mn is more than 0 but less than 0.2, the number of moles of the element M is more than 0.8 but less than 1, and the number of moles of F is more than 5 but less than 7.

15 Claims, 5 Drawing Sheets

(56) References Cited

FOREIGN PATENT DOCUMENTS

| | | | |
|---|---|---|---|
| CN | 116615513 A | 8/2023 |
| JP | 2002347107 A | 12/2002 |
| JP | 2007002241 A | 1/2007 |
| JP | 2010209311 A | 9/2010 |
| JP | 2010254933 A | 11/2010 |
| JP | 2011012091 A | 1/2011 |
| JP | 2012038754 A | 2/2012 |
| JP | 2012224536 A | 11/2012 |
| JP | 2015028148 A | 2/2015 |
| JP | 2015044951 A | 3/2015 |
| JP | 2015143318 A | 8/2015 |
| JP | 2015163733 A | 9/2015 |
| JP | 2015188075 A | 10/2015 |
| JP | 2016066664 A | 4/2016 |
| JP | 2016195284 A | 11/2016 |
| JP | 2017503886 A | 2/2017 |
| JP | 2017078097 A | 4/2017 |
| JP | 2017108129 A | 6/2017 |
| JP | 2017142486 A | 8/2017 |
| JP | 2017521511 A | 8/2017 |
| JP | 2017186524 A | 10/2017 |
| JP | 2018012825 A | 1/2018 |
| JP | 2018035245 | 3/2018 |
| JP | 2018087323 A | 6/2018 |
| JP | 2018137321 A | 8/2018 |
| JP | 2018522959 A | 8/2018 |
| JP | 2018530633 A | 10/2018 |
| JP | 2019024122 A | 2/2019 |
| JP | 2019085575 A | 6/2019 |
| JP | 2019134150 A | 8/2019 |
| JP | 2019522078 A | 8/2019 |
| JP | 2019525974 A | 9/2019 |
| JP | 2019526658 A | 9/2019 |
| JP | 2019183130 A | 10/2019 |
| JP | 2019186537 A | 10/2019 |
| JP | 2020029559 A | 2/2020 |
| JP | 2020075971 A | 5/2020 |
| JP | 2021006900 A | 1/2021 |
| JP | 2021502446 A | 1/2021 |
| WO | 2014104143 A1 | 7/2014 |
| WO | 2020255881 A1 | 12/2020 |
| WO | 2021039290 A1 | 3/2021 |

\* cited by examiner

FLUORIDE PHOSPHOR AND METHOD OF PRODUCING THE SAME, WAVELENGTH CONVERSION MEMBER, AND LIGHT EMITTING DEVICE

CROSS-REFERENCE TO RELATED APPLICATIONS

This application claims priority to Japanese Patent Application No. 2021-102681, filed on Jun. 21, 2021, and Japanese Patent Application No. 2022-089664, filed on Jun. 1, 2022, the disclosures of which are hereby incorporated by reference in their entirety.

BACKGROUND

Field of the Invention

The present disclosure relates to a fluoride phosphor, a method of producing the same, a wavelength conversion member, and a light emitting device.

Description of the Related Art

Light emitting devices using a combination of a light emitting element and a phosphor have been utilized in wide range of fields, such as illumination, vehicle-mounted lighting, displays, and liquid crystal backlights. For example, a phosphor used in a light emitting device for liquid-crystal display device backlight application is required to have an emission peak with a narrow half-value width as well as a high color purity. Examples of such a phosphor include the red light emitting fluoride phosphor having a specific composition, which is disclosed in Japanese Laid-Open Patent Publication No. 2010-209311.

SUMMARY

A first exemplary embodiment is a fluoride phosphor containing fluoride particles having an average particle size of 0.1 μm or more and 7 μm or less and a maximum particle size of 1 μm or more and 18 μm, wherein a ratio of the maximum particle size with respect to the average particle size is higher than 1. The fluoride particles may have a composition comprising: an element M containing at least one selected from the group consisting of Group 4 elements, Group 13 elements, and Group 14 elements; an alkali metal; Mn; and F, wherein, when the number of moles of the alkali metal in the composition is 2, the number of moles of Mn in the composition is more than 0 and less than 0.2, the number of moles of the element M in the composition is more than 0.8 and less than 1, and the number of moles of F in the composition is more than 5 and less than 7.

A second exemplary embodiment is a wavelength conversion layer containing: the fluoride phosphor of the first exemplary embodiment; and a resin.

A third exemplary embodiment is a light emitting device including: the wavelength conversion layer of the second exemplary embodiment; and a light emitting element.

A fourth embodiment is a method of producing a fluoride phosphor, the method including: preparing first fluoride particles having an average particle size of 5 μm or more and 30 μm or less; and performing a pulverization treatment of the first fluoride particles to obtain second fluoride particles having an average particle size of 0.1 μm or more and 7 μm or less and a maximum particle size of 1 μm or more and 18 μm or less, wherein a ratio of the maximum particle size with respect to the average particle size is higher than 1.

DETAILED DESCRIPTION

Figure 1:
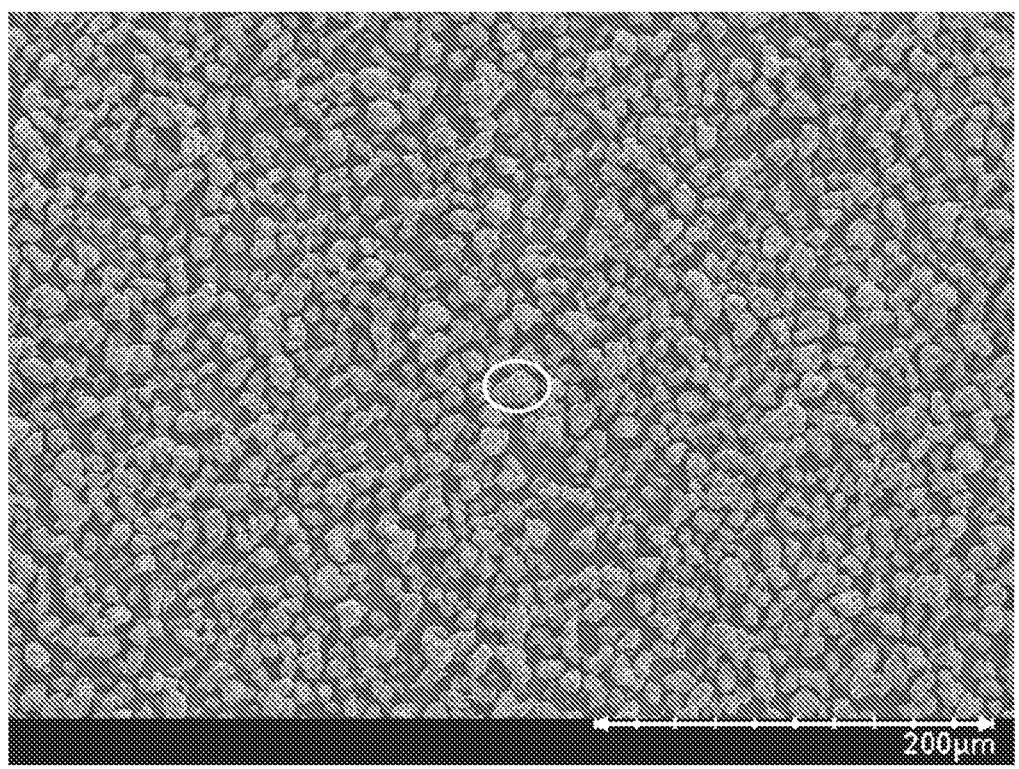
FIG. 1 is an exemplary scanning electron microscope (SEM) image that illustrates an exemplary method of measuring the maximum length of a fluoride particle.

The term "step" used herein encompasses not only a discrete step but also a step that cannot be clearly distinguished from other steps, as long as the intended purpose of the step is achieved. When there are plural substances that correspond to a component of a composition, an indicated amount of the component contained in the composition means, unless otherwise specified, a total amount of the plural substances existing in the composition. Further, upper limit and lower limit values that are described for a numerical range in the present specification may be arbitrarily selected and combined. In the present specification, the relationships between color names and chromaticity coordinates, the relationships between wavelength ranges of light and color names of monochromatic light, and the like conform to JIS Z8110. A half-value width of a phosphor means a wavelength width at which the emission intensity is 50% relative to the maximum emission intensity in an emission spectrum of the phosphor (full-width at half maximum; FWHM). Embodiments of the present invention will now be described in detail. It is noted here, however, that the below-described embodiments are merely examples of a fluoride phosphor, a wavelength conversion member, and a light emitting device that embody the technical idea of the present invention, and the present invention is not limited to the below-described fluoride phosphor, wavelength conversion member, and light emitting device.

Fluoride Phosphor

The fluoride phosphor contains fluoride particles which have an average particle size of 0.1 μm or more and 7 μm or less and a maximum particle size of 1 μm or more and 18 μmor less, and in which a ratio of the maximum particle size with respect to the average particle size (maximum particle size/average particle size) is higher than 1. The fluoride particles have a composition which includes: an element M containing at least one selected from the group consisting of Group 4 elements, Group 13 elements, and Group 14 elements; an alkali metal; Mn; and F. In the composition, when the number of moles of the alkali metal is 2, the number of moles of Mn is more than 0 and less than 0.2, the number of moles of the element M is more than 0.8 and less than 1, and the number of moles of F is more than 5 and less than 7.

By constructing a light emitting device using a fluoride phosphor that is obtained by controlling the average particle size and the maximum particle size of fluoride particles, which have a composition having an appropriately controlled concentration of Mn serving as an activator, to be in appropriate ranges, the amount of the fluoride phosphor required for achieving prescribed chromaticity coordinates (e.g., a CIE chromaticity coordinate value x of 0.16 to 0.26) maybe reduced. The reason for this is believed to be, for example, as follows. A higher concentration of Mn serving as an activator leads to a higher wavelength conversion efficiency and thus enables to reduce the amount of the fluoride phosphor to be used. On the other hand, an excessively high concentration of Mn causes concentration quenching, which leads to deterioration of the properties of the light emitting device. Therefore, in the fluoride phosphor, it is necessary to appropriately control the concentration of Mn. Further, a smaller average particle size of the fluoride particles leads to an increased scattering of excitation light off the surfaces of the fluoride particles and thus enables to reduce the amount of the fluoride phosphor required for obtaining equivalent emission characteristics. On the other hand, an excessively small average particle size causes a reduction in the fluorescence efficiency due to crystal defects existing on the surfaces of the fluoride particles; therefore, it is necessary to control both the average particle size and the maximum particle size to be in appropriate ranges. Moreover, by controlling the maximum particle size to be in an appropriate range, chromaticity variation of light emitted from the light emitting device may be inhibited.

The fluoride particles constituting the fluoride phosphor may be any fluoride particles that contain at least a fluorescent substance activated by Mn, or may consist of a fluorescent substance activated by Mn. In the fluorescent substance activated by Mn, for example, its main crystalline phase may have the same crystal structure as that of a $K_2SiF_6$ crystal, and this crystal structure can be verified by powder X-ray diffractometry. When the main crystalline phase of the fluoride particles has the same crystal structure as that of a $K_2SiF_6$ crystal, a desired emission peak wavelength may be obtained, so that good brightness may be achieved. The fluoride particles may have a single phase in which inclusion of a crystalline phase other than the main crystalline phase is inhibited, or may contain a crystalline phase other than the main crystalline phase as long as it does not greatly affect the properties of the fluoride phosphor.

The average particle size of the fluoride particles constituting the fluoride phosphor may be 0.1 μm to 7 μm, preferably 0.2 μm or larger, or 0.5 μm or larger. Further, the average particle size may be preferably 5 μm or smaller, or 3 μm or smaller. The average particle size of the fluoride particles means an F.S.S.S. No. (Fisher Sub Sieve Sizer's No.) determined by the Fisher Sub Sieve Sizer method (FSSS method), which is an air permeation method. The average particle size according to the FSSS method is measured using, for example, Fisher Sub-Sieve Sizer Model 95 manufactured by Thermo Fisher Scientific, Inc. It has been confirmed by the present inventors that there is a good correlation between the average particle size determined by this method and the average particle size determined from SEM images. The average particle size determined from SEM images is calculated as follows. Plural SEM images in each of which about 100 fluoride particles are observed are obtained at a magnification of ×250 to ×5,000 with an accelerating voltage of 5 kV, and the minimum length and the maximum length of each particle are subsequently measured and an average thereof is calculated to determine the particle size of the particle. An arithmetic mean of the particle size determined for 1,000 particles is calculated, whereby the average particle size is determined from the SEM images.

When the fluoride particles have an average particle size of 7 μm or smaller, the amount of the fluoride phosphor required for achieving desired emission characteristics may be reduced in a light emitting device provided with a wavelength conversion member containing the fluoride phosphor. In addition, variation in the distribution of the fluoride phosphor within the wavelength conversion member may be reduced, so that fluctuation of the excitation efficiency caused by variation in the distribution of the fluoride phosphor may be inhibited, and chromaticity variation of the emission color may be reduced. When the average particle size is 0.1 μm or larger, the dispersibility of the fluoride phosphor in a resin constituting the wavelength conversion member may be improved, so that the fluoride phosphor may be distributed more uniformly. As a result, a highly uniform wavelength conversion member may be easily constructed, and the luminous flux of the light emitting device tends to be further improved.

The maximum particle size of the fluoride particles may be 1 μm to 18 μm, preferably 15 μm or smaller, 10 μm or smaller, or 6 μm or smaller. The maximum particle size of the fluoride particles is determined as follows on a scanning electron microscope (SEM) image. An SEM image in which at least about 500 particles of the fluoride phosphor are observed is obtained at a magnification of ×250 with an accelerating voltage of 5 kV. Among these particles, for each of plural particles estimated to have a maximum particle size, a further enlarged SEM image is obtained. The magnification in this process is about ×5,000. Based on the scale of an SEM image that has been calibrated in advance, the maximum length is measured for each of these plural particles. Comparing the thus measured maximum lengths of the particles, the maximum length of a particle giving a largest value is defined as the maximum particle size of the fluoride particles. It is noted here that the maximum length of a particle means, for a particle observed to exist independently from other particles, a line segment which connects two arbitrary points on the circumference of the particle and has the largest length among line segments passing through the inside of the particle. The phrase "particle observed to exist independently from other particles" used herein means a particle that is judged not to be adhered to any other particle. When the particle is a secondary particle formed by aggregation of plural primary particles, the maximum length of this secondary particle is measured.

Figure 2:
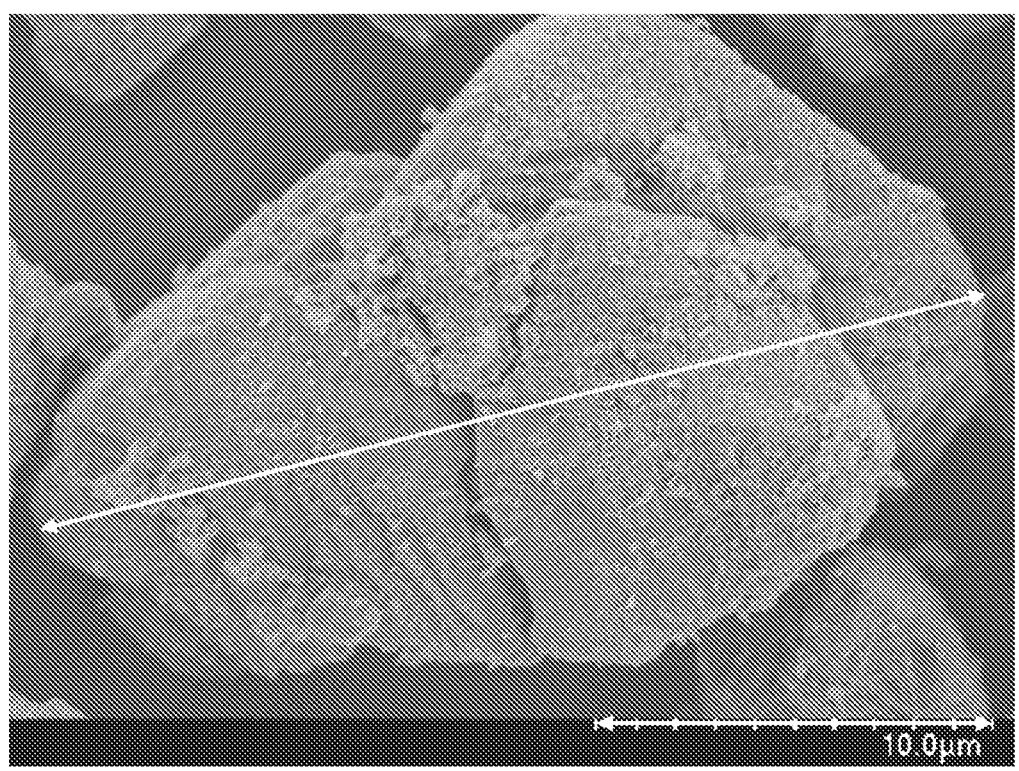
FIG. 2 is an exemplary enlarged SEM image that illustrates an exemplary method of measuring the maximum length of a fluoride particle.

A method of determining the maximum length of particles will now be described referring to the drawings. FIG. 1 is an exemplary SEM image of fluoride particles taken at a magnification of ×250. In the field of view of the SEM image of FIG. 1, a particle marked with a white circle is selected as a particle estimated to have a maximum length. As a further enlarged image of the thus selected particle, an SEM image taken at a magnification of ×5,000 is shown in FIG. 2. As shown in FIG. 2, the selected particle is a secondary particle composed of plural primary particles. As shown in FIG. 2, the maximum length of the fluoride particles is measured as the length of the longest line segment connecting two points on the circumference of this secondary particle.

When the maximum particle size of the fluoride particles is 18 μm or smaller, the dispersibility of the fluoride phosphor in a resin constituting a sheet-form wavelength conversion member tends to be improved. In addition, since the fluoride particles are mixed with other fluorescent materials contained in the wavelength conversion member in a more uniform state, for example, chromaticity variation of the sheet-form wavelength conversion member and uneven color development on the irradiated surface of a light emitting device tend to be inhibited.

The fluoride particles may have any maximum particle size as long as it is larger than the average particle size, i.e. a lower limit of the ratio of the maximum particle size with respect to the average particle size is higher than 1, and may be preferably 2 or higher, or 5 or higher. An upper limit of the ratio of the maximum particle size with respect to the average particle size may be 10 or lower, preferably 6 or lower.

For example, from the standpoint of improving the brightness, the fluoride phosphor may exhibit a particle size distribution having a single peak. The fluoride phosphor may preferably exhibit a single-peak particle size distribution having a narrow distribution width. Specifically, in a volume-based particle size distribution where the particle size corresponding to a cumulative volume of 10% from the small side is defined as D10 while the particle size corresponding to a cumulative volume of 90% is defined as D90, a ratio of D90 to D10 (D90/D10) may be 10 or lower.

The fluoride particles, in its composition, may contain: an element M containing at least one selected from the group consisting of Group 4 elements, Group 13 elements, and Group 14 elements; an alkali metal; Mn; and F. In the composition of the fluoride particles, when the number of moles of the alkali metal is 2, the number of moles of Mn may be more than 0 and less than 0.2, preferably 0.01 to 0.12. Further, in the composition of the fluoride particles, when the number of moles of the alkali metal is 2, the number of moles of the element M may be more than 0.8 and less than 1, preferably 0.88 to 0.99. In the composition of the fluoride particles, when the number of moles of the alkali metal is 2, the number of moles of F may be more than 5 and less than 7, preferably 5.9 to 6.1. The composition of the fluoride particles may be determined by, for example, inductively-coupled plasma (ICP) emission spectrometry. With regard to the details of the composition of the fluoride particles, reference may be made to, for example, Japanese Patent Application No. 2021-091754.

In the composition of the fluoride particles, the element M contains at least one selected from the group consisting of Group 4 elements, Group 13 elements, and Group 14 elements. Examples of the Group 4 elements include titanium (Ti), zirconium (Zr), and hafnium (Hf), and the element M may contain at least one selected from the group consisting of these elements. Examples of the Group 13 elements include boron (B), aluminum (Al), gallium (Ga), indium (In), and thallium (Tl), and the element M may contain at least one selected from the group consisting of these elements. Examples of the Group 14 elements include carbon (C), silicon (Si), germanium (Ge), and tin (Sn), and the element M may contain at least one selected from the group consisting of these elements. The element M may contain at least one of Group 14 elements, preferably at least one of Si and Ge. Further, the element M may contain at least one of Group 13 elements and at least one of Group 14 elements, preferably at least Al and at least one of Si and Ge.

In the composition of the fluoride particles, the alkali metal may contain at least one selected from the group consisting of lithium (Li), sodium (Na), potassium (K), rubidium (Rb), and cesium (Cs). Alternatively, the alkali metal contains at least potassium (K), and may further contain at least one selected from the group consisting of lithium (Li), sodium (Na), rubidium (Rb), and cesium (Cs). A ratio of the number of moles of K with respect to a total number of moles of the alkali metal in the composition may be, for example, 0.90 or higher, preferably 0.97 or higher. An upper limit of the ratio of the number of moles of K may be, for example, 1, or 0.995 or lower. In the composition of the fluoride particles, the alkali metal may be partially substituted with an ammonium ion ($NH_4^+$). When the alkali metal is partially substituted with an ammonium ion, a ratio of the number of moles of ammonium ion with respect to a total number of moles of the alkali metal in the composition may be, for example, 0.10 or lower, and it is preferably 0.03 or lower. A lower limit of the ratio of the number of moles of ammonium ion may be, for example, higher than 0, preferably 0.005 or higher.

A first composition, which is one embodiment of the composition of the fluoride particles, may contain, as the element M, at least one selected from the group consisting of Group 4 elements and Group 14 elements, preferably at least one selected from the group consisting of Group 14 elements, more preferably at least one of Si and Ge, still more preferably at least Si. Further, in the first composition of the fluoride particles, a ratio of a total number of moles of Si, Ge, and Mn with respect to 2 moles of the alkali metal may be 0.9 to 1.1, preferably 0.97 to 1.03.

The first composition of the fluoride particles may be represented by the following Formula (1):

In Formula (1), $A^1$ may contain at least one selected from the group consisting of Li, Na, K, Rb, and Cs. $M^1$ contains at least one of Si and Ge, and may further contain at least one element selected from the group consisting of Group 4 elements and Group 14 elements. Mn may be a tetravalent manganese ion. Further, b satisfies $0<b<0.2$, c represents an absolute value of the charge of $[M^1_{1-b}Mn_bF_d]$ ion, and d satisfies $5<d<7$.

In Formula (1), $A^1$ contains at least K, and may further contain at least one selected from the group consisting of Li, Na, Rb, and Cs. Further, $A^1$ may be partially substituted with an ammonium ion ($NH_4^+$). When $A^1$ is partially substituted with an ammonium ion, a ratio of the number of moles of ammonium ion with respect to a total number of moles of $A^1$ in the composition may be, for example, 0.10 or lower, and it is preferably 0.05 or lower, or 0.03 or lower. A lower limit of the ratio of the number of moles of ammonium ion may be, for example, higher than 0, preferably 0.005 or higher.

In Formula (1), b is preferably 0.005 to 0.15, or 0.015 to 0.1; c may be, for example, 1.8 to 2.2, preferably 1.95 to 2.05; and d is preferably 5.5 to 6.5, and may be 5.9 to 6.1.

A second composition, which is another embodiment of the composition of the fluoride particles, may contain, as the element M, at least one selected from the group consisting of Group 4 elements and Group 14 elements along with at least one of Group 13 elements, preferably at least one selected from the group consisting of Group 14 elements along with at least one of Group 13 elements, more preferably at least Si and Al. Further, in the second composition of the fluoride particles, a ratio of a total number of moles of Si, Al, and Mn with respect to 2 moles of the alkali metal may be 0.9 to 1.1, preferably 0.97 to 1.03. Moreover, in the second composition of the fluoride particles, a ratio of the number of moles of Al with respect to 2 moles of the alkali metal may be higher than 0 but 0.1 or lower, preferably 0.003 to 0.015.

The second composition of the fluoride particles may be represented by the following Formula (2):

In Formula (2), $A^2$ contains at least K, and may further contain at least one selected from the group consisting of Li, Na, Rb, and Cs. $M^2$ contains at least Si and Al, and may further contain at least one element selected from the group consisting of Group 4 elements, Group 13 elements, and Group 14 elements. Mn may be a tetravalent manganese ion. Further, e satisfies $0<e<0.2$, f represents an absolute value of the charge of $[M^2_{1-e}Mn_eF_g]$ ion, and g satisfies $5<g<7$.

In Formula (2), $A^2$ may be partially substituted with an ammonium ion ($NH_4^+$). When $A^2$ is partially substituted with an ammonium ion, a ratio of the number of moles of ammonium ion with respect to a total number of moles of $A^2$ in the composition may be, for example, 0.10 or lower, and it is preferably 0.03 or lower. A lower limit of the ratio of the number of moles of ammonium ion may be, for example, higher than 0, preferably 0.005 or higher.

In Formula (2), e is preferably 0.005 to 0.15, or 0.015 to 0.1; f may be, for example, 1.8 to 2.2, preferably 1.95 to 2.05; and g is preferably 5.5 to 6.5, and may be 5.9 to 6.1.

The surfaces of the fluoride particles constituting the fluoride phosphor may have an inorganic substance other than the fluoride particles that is attached thereto at least partially. By attaching an inorganic substance to the surfaces of the fluoride particles, aggregation of the fluoride particles may be inhibited; therefore, for example, the dispersibility in a resin tends to be improved. In addition, the moisture resistance of the fluoride phosphor tends to be improved. Examples of the inorganic substance other than the fluoride particles include oxides, metal salts, fluorides, and nitrides, and the inorganic substance may contain at least one selected from the group consisting of these compounds, preferably at least one selected from the group consisting of oxides and metal salts. The inorganic substance attached to the fluoride particles may be of a single kind, or a combination of two or more kinds. When two or more kinds of inorganic substances are used in combination, a mixture of the inorganic substances may be attached to the fluoride particles, or the inorganic substances may be sequentially attached to form a multi-layer structure.

The oxides may contain at least one selected from the group consisting of Si, Al, Ti, Zr, Sn, and Zn. In other words, the oxides may contain at least one selected from the group consisting of silicon oxide (e.g., $SiO_x$, wherein x may be 1 to 2, preferably 1.5 to 2, or about 2), aluminum oxide (e.g., $Al_2O_3$), titanium oxide (e.g., $TiO_2$), zirconium oxide (e.g., $ZrO_2$), tin oxide (e.g., SnO and $SnO_2$), and zinc oxide (e.g., ZnO), and may contain at least silicon oxide. The oxides may consist of a single kind of oxide, or may contain two or more kinds of oxides.

The content ratio of an oxide in the fluoride phosphor may be 0.02% by mass to 30% by mass, preferably 1% by mass to 15% by mass, with respect to the fluoride phosphor. The content ratio of an oxide in the fluoride phosphor can be determined by, for example, inductively-coupled plasma (ICP) emission spectrometry.

The metal salts may contain, for example, a rare earth phosphate and/or an alkaline earth metal phosphate, and may contain at least one selected from the group consisting of these phosphates. The rare earth phosphate may contain at least one rare earth element selected from the group consisting of lanthanum (La), cerium (Ce), dysprosium (Dy), and gadolinium (Gd), preferably at least lanthanum.

The content ratio of a metal salt in the fluoride phosphor may be, in terms of its metal element, for example, 0.1% by mass to 20% by mass, preferably 0.2% by mass to 10% by mass.

Examples of a fluoride other than the fluoride particles include: fluorides containing a Group 2 element, such as magnesium fluoride and calcium fluoride; and fluorosilicates, such as alkali metal hexafluorosilicates.

The content ratio of a fluoride other than the fluoride particles in the fluoride phosphor may be, for example, 0.1% by mass to 15% by mass, preferably 0.3% by mass to 10% by mass.

The inorganic substance attached to the surfaces of the fluoride particles may be in the form of inorganic substance particles and cover the surfaces of the fluoride particles. Alternatively, the inorganic substance may cover the surfaces of the fluoride particles in the form of a film, or may be arranged as an inorganic substance layer on the surfaces of the fluoride particles.

The fluoride phosphor may be a phosphor activated by tetravalent manganese ion, and absorbs light in a short wavelength region of visible light and emits red light. An excitation light preferably contains light of a wavelength range having a high excitation intensity of the fluoride phosphor. Particularly, the excitation light may be a light in the blue region and have an emission peak wavelength in a range of, for example, 380 nm to 485 nm. In the emission spectrum of the fluoride phosphor, an emission peak wavelength may be in a range of, for example, 610 nm to 650 nm. In the emission spectrum of the fluoride phosphor, a half-value width may be, for example, 10 nm or less.

Method of Producing Fluoride Phosphor

The fluoride particles constituting the fluoride phosphor may be produced by, for example, in the following manner. When the fluoride particles have the first composition, the fluoride particles may be produced by, for example, a production method that may include the step of mixing: a solution (a) which contains at least a first complex ion containing tetravalent manganese, a second complex ion containing at least one selected from the group consisting of Group 4 elements and Group 14 elements along with fluorine ion, and hydrogen fluoride; and a solution (b) which contains at least an alkali metal containing at least potassium, and hydrogen fluoride.

The fluoride particles may also be produced by, for example, a production method that may include the step of mixing: a first solution which contains at least a first complex ion containing tetravalent manganese, and hydrogen fluoride; a second solution which contains at least an alkali metal containing at least potassium, and hydrogen fluoride; and a third solution which contains at least a second complex ion containing at least one selected from the group consisting of Group 4 elements and Group 14 elements along with fluorine ion. With regard to a method of producing the fluoride particles having the first composition, reference may be made to, for example, Japanese Laid-Open Patent Publication No. 2015-143318 (corresponding to U.S. Pat. No. 9,670,403) and Japanese Laid-Open Patent Publication No. 2015-188075 (corresponding to U.S. Pat. No. 9,419,187).

When the fluoride particles have the second composition, the fluoride particles may be produced by, for example, the production method described in Japanese Laid-Open Patent Publication No. 2010-254933. Alternatively, as a method of producing the fluoride particles having the second composition, reference may be made to, for example, Japanese Patent Application No. 2020-212532. In other words, the fluoride particles having the second composition may be produced by a production method that includes: preparing fluoride particles having the first composition; preparing a fluoride that contains Al, an alkali metal, and F; and heat-treating a mixture containing the fluoride and the fluoride particles having the first composition in an inert gas atmosphere at a temperature of 600° C. to 780° C. The fluoride that contains Al, an alkali metal, and F has a composition in which a ratio of a total number of moles of the alkali metal may be 1 to 3, and a ratio of the number of moles of F may be 4 to 6, with respect to 1 mole of Al. Alternatively, the ratio of a total number of moles of the alkali metal may be 2 to 3, and the ratio of the number of moles of F may be 5 to 6, with respect to 1 mole of Al.

In the method of producing a fluoride phosphor, it is possible to precipitate fluoride particles having desired average particle size and maximum particle size by controlling the conditions such as the concentration and the dropwise addition rate of each fluorine-containing reaction solution in which constituent elements of the fluoride particles are dissolved.

The method of producing a fluoride phosphor may include the adjustment step of adjusting the particle size of the fluoride particles. This adjustment step may include, for example, pulverizing the fluoride particles to obtain a pulverized product. The fluoride particles subjected to the adjustment step may have an average particle size of, for example, 5 µm to 30 µm, preferably 7 µm to 25 µm. Further, the fluoride particles subjected to the adjustment step may have a maximum particle size of, for example, 10 µm to 100 µm, preferably 15 µm to 60 µm.

A method of pulverizing the fluoride particles may be selected as appropriate from commonly used pulverization methods such as ball milling, bead milling, and jet milling. The pulverization of the fluoride particles is preferably performed by a wet process. By performing the pulverization by a wet process, the particle size distribution may be adjusted to be narrow while inhibiting a reduction in the brightness of the resulting fluoride phosphor. Such a wet pulverization treatment may be performed by, for example, ball milling the fluoride particles together with a pulverization medium in a liquid medium. Examples of the liquid medium include: aqueous liquid media, such as water and a hydrogen peroxide solution; and organic solvents such as ethanol. The liquid medium may contain at least an aqueous liquid medium. Examples of the pulverization medium include alumina balls, zirconia balls, and urethane balls.

In the pulverization treatment, the pulverization medium may be used in any amount as long as the amount of the fluoride particles is, for example, 1% by mass to 50% by mass, preferably 5% by mass to 30% by mass, with respect to the amount of the pulverization medium.

In the pulverization treatment using a ball mill, it is preferred to perform pulverization while reducing the pulverization efficiency at a low rate over a period of, for example, 1 to 72 hours. By slowly pulverizing the fluoride particles with a weak shear force over a period of 1 hour or longer, micropulverization of the fluoride particles may be inhibited, so that a reduction in the brightness of the resulting fluoride phosphor may be inhibited. The productivity may be improved by setting the duration of the pulverization to be 72 hours or shorter. The duration of the pulverization using a ball mill may be preferably 2 hours to 24 hours. Further, the temperature in the pulverization treatment may be, for example, 0° C. to 80° C., preferably 5° C. to 50° C.

The method of producing a fluoride phosphor may further include adjusting the particle size distribution of the pulverized product. By adjusting the particle size distribution of the pulverized product, fluoride particles having a narrower particle size distribution may be obtained. The particle size distribution of the pulverized product may be adjusted by, for example, washing with a liquid medium and classification.

The method of producing a fluoride phosphor may further include the fluorine treatment step of heat-treating the fluoride particles in a fluorine gas-containing atmosphere. A heat treatment of the fluoride particles in a fluorine gas atmosphere tends to further improve the brightness of the resulting fluoride phosphor. The fluorine gas-containing atmosphere may contain an inert gas such as nitrogen gas, in addition to fluorine gas. The concentration of fluorine gas in the fluorine gas-containing atmosphere may be, for example, 1% by volume to 100% by volume, preferably 10% by volume to 30% by volume.

The temperature of the heat treatment may be, for example, 100° C. to 700° C., preferably 300° C. to 600° C. The duration of the heat treatment may be, for example, 1 hour to 100 hours, preferably 2 hours to 48 hours. It is noted here that the duration of the heat treatment means a period in which the temperature is maintained after reaching a prescribed temperature.

The method of producing a fluoride phosphor may also include the surface treatment step of attaching an inorganic substance to at least part of the surfaces of the fluoride particles. By this surface treatment step, a fluoride phosphor with a further improved dispersibility in a resin may be obtained. In addition, since the surfaces of the fluoride particles are provided with the inorganic substance, the permeability of oxygen, water vapor and the like are further reduced, so that the durability may be further improved. A method of the surface treatment step may be selected as appropriate from commonly used methods in accordance with the inorganic substance to be attached. As the fluoride particles for the surface treatment step, those whose average particle size and maximum particle size have been adjusted in desired ranges are used.

When the inorganic substance to be attached in the surface treatment step is an oxide, for example, the fluoride particles are brought into contact with a metal alkoxide in a liquid medium, whereby an oxide derived from the metal alkoxide may be attached to at least part of the surfaces of the fluoride particles. The metal alkoxide may be, for example, a metal alkoxide containing at least one selected from the group consisting of Si, Al, Ti, Zr, Sn, and Zn, or a metal alkoxide containing at least one of Si and Al. An aliphatic group of an alkoxide constituting the metal alkoxide may have, for example, 1 to 6 carbon atoms. With regard to the details of a method for attaching an oxide to the fluoride particles, reference may be made to, for example, the descriptions in Japanese Patent Application No. 2021-091754 and known matters pertaining to so-called sol-gel method.

Specifically, the metal alkoxide is preferably, for example, at least one selected from the group consisting of tetramethoxysilane, tetraethoxysilane, tetraisopropoxysilane, trimethoxyaluminum, triethoxyaluminum, and triisopropoxyaluminum.

The amount of the metal alkoxide used in the surface treatment step may be, for example, 5% by mass to 110% by mass, with respect to a total mass of the fluoride particles.

Examples of the liquid medium include: water; alcohol-based solvents, such as methanol, ethanol, and isopropyl alcohol; nitrile-based solvents, such as acetonitrile; and hydrocarbon-based solvents, such as hexane. The liquid medium may contain at least water and an alcohol-based solvent. When the liquid medium contains an alcohol-based solvent, the content ratio of the alcohol-based solvent in the liquid medium may be, for example, not less than 60% by mass. Further, the content ratio of water in the liquid medium may be, for example, 4% by mass to 40% by mass.

The liquid medium may further contain a pH modifier. As the pH modifier, for example, an alkaline substance such as ammonia, sodium hydroxide, or potassium hydroxide, or an acidic substance such as hydrochloric acid, nitric acid, sulfuric acid, or acetic acid, may be used. When the liquid medium contains a pH modifier, the liquid medium may have a pH of, for example, 1 to 6 in an acidic condition, or 8 to 12 in an alkaline condition.

The mass ratio of the liquid medium with respect to the fluoride particles may be, for example, 100% by mass to 1,000% by mass. When the mass ratio of the liquid medium is in this range, the fluoride particles tend to be more uniformly coated with an oxide.

The fluoride particles and the metal alkoxide may be brought into contact with each other by, for example, adding the metal alkoxide to a suspension containing the fluoride particles. This process may be accompanied by stirring or the like if necessary. The contact temperature of the fluoride particles and the metal alkoxide may be, for example, 0° C. to 70° C. The contact time may be, for example, 1 hour to 12 hours. It is noted here that the contact time includes the time required for adding the metal alkoxide.

When the inorganic substance to be attached in the surface treatment step is a metal salt, for example, the fluoride particles are brought into contact with a metal ion and an anion in a liquid medium, whereby a metal salt may be attached to at least part of the surfaces of the fluoride particles. Specifically, when the metal salt is a rare earth phosphate, the fluoride particles, a rare earth ion, and a phosphate ion are brought into contact in a liquid medium. As a result, the fluoride particles having the rare earth phosphate attached to their surfaces are obtained. It is believed that, by attaching the rare earth phosphate to the fluoride particles in a liquid medium, the rare earth phosphate may be attached more uniformly to, for example, the surfaces of the fluoride particles.

The liquid medium preferably contains a phosphate ion, more preferably contains water and a phosphate ion. When the liquid medium contains a phosphate ion, prepared fluoride particles and the liquid medium are mixed, and the resultant is further mixed with a solution containing a rare earth ion, whereby the phosphate ion and the rare earth ion may be brought into contact with each other in the liquid medium containing the fluoride particles. When the liquid medium contains a phosphate ion, the concentration of the phosphate ion in the liquid medium is, for example, 0.05% by mass or higher but, for example, 5% by mass or lower. When the concentration of the phosphate ion in the liquid medium is equal to or higher than the above-described lower limit value, since the amount of the liquid medium is not excessively large, elution of constituent components from the fluoride particles is inhibited, so that the properties of the resulting fluoride phosphor tend to be maintained in a favorable manner. Meanwhile, when the concentration of the phosphate ion is equal to or lower than the above-described upper limit value, the substance attached to the fluoride particles tend to have a good uniformity.

Examples of the phosphate ion include orthophosphate ions, polyphosphate (metaphosphate) ions, phosphite ions, and hypophosphite ions. Examples of the polyphosphate ions include: those having a straight-chain structure, such as a pyrophosphate ion and a tripolyphosphate ion; and cyclic polyphosphate ions, such as a hexametaphosphate ion.

When the liquid medium contains a phosphate ion, the liquid medium may be prepared by dissolving a compound serving as a phosphate ion source into a liquid medium, or by mixing a solution containing a phosphate ion source with a liquid medium. Examples of the phosphate ion source include: phosphoric acid; metaphosphoric acid; alkali metal phosphates, such as sodium phosphate and potassium phosphate; alkali metal hydrogen phosphates, such as sodium hydrogen phosphate and potassium hydrogen phosphate; alkali metal dihydrogen phosphates, such as sodium dihydrogen phosphate and potassium dihydrogen phosphate; alkali metal hexametaphosphates, such as sodium hexametaphosphate and potassium hexametaphosphate; alkali metal pyrophosphates, such as sodium pyrophosphate and potassium pyrophosphate; and ammonium phosphates, such as ammonium phosphate.

The liquid medium preferably contains a reducing agent, more preferably contains water and a reducing agent, still more preferably contains water, a phosphate ion, and a reducing agent. By incorporating a reducing agent into the liquid medium, precipitation of manganese dioxide and the like derived from manganese contained in the fluoride particles may be effectively inhibited. The reducing agent to be incorporated into the liquid medium may be any reducing agent as long as it is capable of reducing, for example, tetravalent manganese ions eluted from the fluoride particles into the liquid medium, and examples of such a reducing agent include hydrogen peroxide, oxalic acid, and hydroxylamine hydrochloride. Thereamong, hydrogen peroxide is preferred since it is dissolved in water and thus does not adversely affect the fluoride particles.

When the liquid medium contains a reducing agent, the liquid medium may be prepared by dissolving a compound serving as the reducing agent into a liquid medium, or by mixing a solution containing the reducing agent with a liquid medium. A content ratio of the reducing agent in the liquid medium is not particularly limited, and it may be, for example, 0.1% by mass or higher for the above-described reasons.

Examples of a rare earth element giving the rare earth ion brought into contact with the phosphate ion include, in addition to Sc and Y, lanthanoids consisting of La, Ce, Pr, Nd, Pm, Sm, Eu, Gd, Tb, Dy, Ho, Er, Tm, Yb, and Lu.

A contact between the phosphate ion and the rare earth ion in the liquid medium may be made by, for example, dissolving a compound serving as a source of the rare earth ion into a liquid medium containing the phosphate ion, or mixing a liquid medium containing the phosphate ion with a solution containing the rare earth ion. The solution containing the rare earth ion may be prepared by, for example, dissolving a compound serving as a source of the rare earth ion into a solvent such as water. The compound serving as a source of the rare earth ion is, for example, a metal salt containing the rare earth element, and examples of an anion constituting the metal salt include a nitrate ion, a sulfate ion, an acetate ion, and a chloride ion.

The process of bringing the phosphate ion and the rare earth ion into contact with each other in the liquid medium may include, for example: obtaining a phosphor slurry by mixing the liquid medium, which contains the phosphate ion and preferably further contains a reducing agent, with the fluoride particles; and mixing the thus obtained phosphor slurry with a solution containing the rare earth ion.

In the liquid medium in which the phosphate ion and the rare earth ion are brought into contact, the content ratio of the rare earth ion is, for example, 0.05% by mass to 3% by mass. Further, in the liquid medium, the content ratio of the rare earth ion with respect to the fluoride particles is, for example, 0.2% by mass to 30% by mass. When the concentration of the rare earth ion is equal to or higher than the above-described lower limit value, the attachment rate of a rare earth phosphate to the fluoride particles tends to be further improved, while when the concentration of the rare earth ion is equal to or lower than the above-described upper limit value, attachment of a rare earth phosphate to the surfaces of the fluoride particles tends to be achieved more uniformly and more easily.

The contact temperature of the phosphate ion and the rare earth ion that form a rare earth phosphate may be, for example, 10° C. to 50° C. Further, the contact time may be, for example, 1 minute to 1 hour. The phosphate ion and the rare earth ion may be brought into contact while stirring the liquid medium. With regard to a method of attaching a rare earth phosphate to the surfaces of the fluoride particles, reference may be made to, for example, Japanese Laid-Open Patent Publication No. 2017-186524 (corresponding to U.S. Ser. No. 10/131,837).

When the inorganic substance to be attached in the surface treatment step is a fluoride, the fluoride particles are brought into contact with a metal ion and a fluoride ion in a liquid medium, whereby a fluoride may be attached to at least part of the surfaces of the fluoride particles.

When the fluoride to be attached is a Group 2 element-containing fluoride such as magnesium fluoride or calcium fluoride, the fluoride particles are brought into contact with a Group 2 metal ion and a fluoride ion in a liquid medium, whereby the fluoride particles having the Group 2 element-containing fluoride attached to their surfaces may be obtained. With regard to a method of attaching a Group 2 element-containing fluoride, reference may be made to, for example, Japanese Laid-Open Patent Publication No. 2015-044951 (corresponding to U.S. Ser. No. 10/030,196).

Further, when the fluoride to be attached is an alkali metal fluorosilicate, the fluoride particles are brought into contact with a fluorosilicate ion and an alkali metal ion in a liquid medium, whereby the fluoride particles having the alkali metal fluorosilicate attached to their surfaces may be obtained. With regard to a method of attaching an alkali metal fluorosilicate, reference may be made to, for example, Japanese Laid-Open Patent Publication No. 2015-028148 (corresponding to U.S. Pat. No. 9,120,972).

In the surface treatment step, two or more kinds of inorganic substances may be attached as well. The surface treatment step may include, for example: attaching a rare earth phosphate to the fluoride particles; and attaching an oxide to the thus obtained rare earth phosphate-attached fluoride particles.

The method of producing a fluoride phosphor may further include, for example: the step of recovering a fluoride phosphor obtained after the surface treatment step by solid-liquid separation; and the step of drying the fluoride phosphor recovered by solid-liquid separation.

The method of producing a fluoride phosphor may also include the coupling treatment step of treating the fluoride phosphor obtained in the surface treatment step with a coupling agent. In this coupling treatment step, by bringing the fluoride phosphor into contact with a coupling agent, the surface of the fluoride phosphor may be provided with a surface treatment layer that contains functional groups derived from the coupling agent. As a result, for example, the moisture resistance of the fluoride phosphor may be improved.

Examples of the functional groups derived from the coupling agent include silyl groups having an aliphatic group with 1 to 20 carbon atoms, and the functional groups may be preferably silyl groups having an aliphatic group with 6 to 12 carbon atoms. The functional groups derived from the coupling agent may be of a single kind, or a combination of two or more kinds.

Specific examples of the coupling agent include silane coupling agents, titanium coupling agents, and aluminum coupling agents.

The amount of the coupling agent used in the coupling treatment step may be, for example, 0.5% by mass to 10% by mass with respect to the mass of the fluoride phosphor. The contact temperature of the fluoride phosphor and the coupling agent may be, for example, 0° C. to 70° C. The contact time of the fluoride phosphor and the coupling agent may be, for example, 1 minute to 10 hours.

A first embodiment of the method of producing a fluoride phosphor may include: preparing first fluoride particles having an average particle size of 5 μm to 30 μm; and performing a pulverization treatment of the first fluoride particles to obtain second fluoride particles which have an average particle size of 0.1 μm to 7 μm and a maximum particle size of 1 μm to 18 μm, and in which a ratio of the maximum particle size with respect to the average particle size is higher than 1.

A second embodiment of the method of producing a fluoride phosphor may include: preparing first fluoride particles having an average particle size of 5 μm to 30 μm; performing a pulverization treatment of the first fluoride particles to obtain a pulverized product; and performing a surface treatment on the pulverized product to obtain third fluoride particles which have an average particle size of 0.1 μm to 7 μm and a maximum particle size of 1 μm to 18 μm, and in which a ratio of the maximum particle size with respect to the average particle size is higher than 1.

In the method of producing a fluoride phosphor according to the second embodiment, the surface treatment may include bringing the pulverized product into contact with a metal alkoxide containing at least one selected from the group consisting of Si, Al, Ti, Zr, Sn, and Zn in a liquid medium to obtain first oxide-attached fluoride particles in which an oxide derived from the metal alkoxide is attached to at least part of the surface of the pulverized product.

In the method of producing a fluoride phosphor according to the second embodiment, the surface treatment may include bringing the pulverized product into contact with a rare earth ion containing at least one selected from the group consisting of La, Ce, Dy, and Gd, as well as a phosphate ion to obtain rare earth phosphate-attached fluoride particles in which a rare earth phosphate is attached to at least part of the surface of the pulverized product.

In the method of producing a fluoride phosphor according to the second embodiment, the surface treatment may further include bringing the rare earth phosphate-attached fluoride particles into contact with a metal alkoxide containing at least one selected from the group consisting of Si, Al, Ti, Zr, Sn, and Zn in a liquid medium to obtain second oxide-attached fluoride particles in which an oxide derived from the metal alkoxide is attached to at least part of the surfaces of the rare earth phosphate-attached fluoride particles.

Wavelength Conversion Member

A wavelength conversion member may include a wavelength conversion layer that contains the above-described fluoride phosphor and a resin. By incorporating the above-described fluoride phosphor into a wavelength conversion member, desired chromaticity coordinates may be achieved in the emission of a light emitting device while reducing the content of the fluoride phosphor. In addition, the wavelength conversion member may be configured to have a uniform distribution of the fluoride phosphor. The wavelength conversion layer may be, for example, in the form of a sheet which has a pair of main surfaces that are perpendicular to the thickness direction and face each other, and a side surface that is parallel to the thickness direction and surrounds the periphery of the main surfaces.

The resin constituting the wavelength conversion layer may be any transparent resin that allows visible light to pass therethrough. Specific examples of such a resin include: thermosetting resins, such as silicone resins and epoxy resins; and photocurable resins, such as acrylic resins.

The content of the fluoride phosphor in the wavelength conversion layer is adjusted such that the chromaticity coordinate values of light emitted from a light emitting device provided with the wavelength conversion layer is in desired ranges. Specifically, the content of the fluoride phosphor in the wavelength conversion layer may be, for example, 5% by mass to 85% by mass, preferably 10% by mass to 75% by mass, with respect to 100% by mass of the resin. When the content of the fluoride phosphor is 5% by mass or more, a light emitting device capable of emitting light having desired chromaticity coordinate values may be easily constructed. Meanwhile, when the content of the fluoride phosphor is 85% by mass or less, chromaticity variation of light emitted from a light emitting device may be inhibited while reducing the amount of the fluoride phosphor to be used.

An average thickness of the wavelength conversion layer may be, for example, 20 μm to 100 μm, preferably 30 μm to 70 μm. Further, a range of variation in thickness of the wavelength conversion layer may be, for example, 10 μm or less, preferably 5 μm or less. The average thickness of the wavelength conversion layer is determined by measuring the thickness at 9 points on an arbitrary cross-section of the wavelength conversion layer in the thickness direction, and calculating the arithmetic mean of the measured values. The range of variation in thickness of the wavelength conversion layer is calculated as a difference between a maximum value and a minimum value of the thus measured thickness of the wavelength conversion layer.

The wavelength conversion layer may further contain a light-emitting material other than the fluoride phosphor. The light-emitting material other than the fluoride phosphor may be a material that absorbs light emitted from a light source and converts this light into a light having a wavelength different from that of a light emitted from the fluoride phosphor, or into a light having a comparable wavelength.

A light-emitting material other than the fluoride phosphor may have an emission peak wavelength in a range of, for example, 495 nm to 590 nm, and the phosphor may be preferably at least one selected from the group consisting of a β sialon phosphor, a halosilicate phosphor, a silicate phosphor, a rare earth aluminate phosphor, a perovskite quantum dot, and a nitride phosphor. The 13 sialon phosphor may have a composition represented by, for example, the below-described Formula (IIa). The halosilicate phosphor may have a composition represented by, for example, the below-described Formula (IIb). The silicate phosphor may have a composition represented by, for example, the below-described Formula (IIc). The rare earth aluminate phosphor may have a composition represented by the below-described Formula (IId). The perovskite quantum dot may have a composition represented by, for example, the below-described Formula (IIe). The nitride phosphor may have a composition represented by, for example, the below-described Formula (IIf), (IIg), or (IIh). By incorporating a β sialon phosphor or a perovskite quantum dot into the wavelength conversion layer as a phosphor other than the fluoride phosphor, a light emitting device having a relatively wide range of color reproducibility may be obtained. Further, by incorporating a halosilicate phosphor, a silicate phosphor, a rare earth aluminate phosphor, or a nitride phosphor as a phosphor other than the fluoride phosphor into the wavelength conversion layer, a light emitting device having excellent color rendering properties or a high emission efficiency may be obtained.

$$Si_{6-t}Al_tO_tN_{8-t}:Eu \quad (IIa),$$

wherein, t represents a number satisfying $0 < t \leq 4.2$;

$$(Ca,Sr,Ba)_8MgS_{14}O_{16}(F,Cl,Br)_2:Eu \quad (IIb);$$

$$(Ba,Sr,Ca,Mg)_2SiO_4:Eu \quad (IIc);$$

$$(Y,Lu,Gd,Tb)_3(Al,Ga)_5O_{12}:Ce \quad (IId);$$

$$CsPb(F,Cl,Br,I)_3 \quad (IIe);$$

$$(La,Y,Gd)_3Si_6N_{11}:Ce \quad (IIf);$$

$$(Sr,Ca)LiAl_3N_4:Eu \quad (IIg);$$

$$(Ca,Sr)AlSiN_3:Eu \quad (IIh).$$

In the present specification, plural elements listed separately with commas (,) in a formula representing the composition of a light-emitting material mean that at least one of the plural elements is contained in the composition. Further, in a formula representing the composition of a phosphor, the part preceding a colon (:) represents a host crystal, and the part following the colon (:) represents an activating element.

An average particle size of a phosphor other than the fluoride phosphor may be, for example, 0.1 μm to 7 μm, preferably 0.2 μm or larger, or 0.5 μm or larger. Further, the average particle size may be preferably 5 μm or smaller, or 3 μm or smaller. The average particle size of a phosphor other than the fluoride phosphor is determined by the FSSS method.

The wavelength conversion layer may further contain quantum dots in addition to the fluoride phosphor. The quantum dots may be those which absorb light emitted from a light source and convert this light into a light having a wavelength different from that of a light emitted from the fluoride phosphor, or into a light having a comparable wavelength. Examples of the quantum dots include: quantum dots that have a perovskite structure having a composition such as $(Cs,FA,MA)(Pb,Sn)(Cl,Br,I)_3$ (wherein, FA means formamidinium, and MA means methylammonium); quantum dots that have a chalcopyrite structure having a composition such as $(Ag,Cu,Au)(In,Ga)(S,Se,Te)_2$; semiconductor quantum dots such as $(Cd,Zn)(Se,S)$; and InP-based semiconductor quantum dots, and the wavelength conversion layer may contain at least one type of quantum dots selected from the group consisting of the above-exemplified quantum dots. It is noted here that, in the formulae each representing the composition of quantum dots, plural elements listed separately with commas (,) mean that at least one of the plural elements is contained in the composition.

The wavelength conversion layer may further contain a light diffusing material in addition to the resin and the fluoride phosphor. By incorporating a light diffusing material, the directivity of light emitted from a light emitting element is reduced, so that the viewing angle may be increased. Examples of the light diffusing material include silicon oxide, titanium oxide, zinc oxide, zirconium oxide, and aluminum oxide.

The wavelength conversion member may further include a substrate that supports the wavelength conversion layer. By incorporating a substrate, the wavelength conversion member may be configured to have, for example, superior durability and superior ease of handling. The substrate may be, for example, in the form of a sheet that covers a main surface of the wavelength conversion layer. The substrate may be arranged on one side of the wavelength conversion layer, or may be arranged on both sides of the wavelength conversion layer to sandwich the wavelength conversion layer.

Examples of a material of the substrate include polyethylene terephthalate resins, acrylic resins, polyester resins, and glass. The substrate may further contain the above-described light diffusing material. The thickness of the substrate may be, for example, 20 μm to 200 μm, preferably 25 μm to 150 μm. The substrate may be a translucent substrate having visible light permeability. The substrate may have a light transmittance of, for example, 80% or higher, preferably 85% or higher, in the visible light region.

The substrate may have an oxide layer on its surface. By providing the substrate with an oxide layer, the permeability of oxygen, water vapor and the like is further reduced, so that the wavelength conversion member may be configured to have superior durability. Examples of the oxide include silicon oxide and aluminum oxide. The thickness of the oxide layer may be, for example, 0.05 μm to 5 μm, preferably 0.2 μm to 3 μm. The oxide layer may be arranged on one side of the substrate, or may be arranged on both sides of the substrate.

The wavelength conversion member is capable of emitting light in a wavelength range of longer than 480 nm but 650 nm or shorter when irradiated with light having a wavelength of, for example, 420 nm to 480 nm.

The wavelength conversion member may be produced by, for example, the following production method. A method of producing the wavelength conversion member may include: preparing a resin composition that contains a fluoride phosphor and an uncured resin raw material; supplying the thus prepared resin composition to one side of a substrate to form a resin composition layer; and curing the thus formed resin composition layer to form a wavelength conversion layer.

Examples of the resin raw material contained in the resin composition include thermosetting silicone resins and epoxy resins, and photocurable acrylic monomers and urethane acrylic monomers. The content of the fluoride phosphor in the resin composition may be, for example, 5% by mass to 52% by mass, preferably 10% by mass to 45% by mass, with respect to 100% by mass of the resin raw material.

As for the amount of the resin composition to be supplied onto the substrate, the resin composition may be supplied such that, for example, the wavelength conversion layer obtained after the curing has a thickness of 20 μm to 100 μm, preferably 30 μm to 70 μm. As a supplying method, a commonly used liquid supplying method that employs a comma coater, a die coater, a bar coater or the like may be applied. On the resin composition layer formed on the substrate, another substrate may be disposed as well. By this, a wavelength conversion member having superior durability may be obtained.

As for a method of curing the resin composition layer formed on the substrate, for example, when the resin raw material is curable with heat, the resin composition layer is cured by, for example, a heat treatment performed at a temperature of 140° C. to 160° C. for a period of 2 hours to 2.5 hours, whereby a wavelength conversion layer is formed. Meanwhile, when the resin raw material is photocurable, the resin composition layer is cured by irradiation with light having a wavelength range of 350 nm to 400 nm, whereby a wavelength conversion layer is formed.

Light Emitting Device

A light emitting device may include the above-described wavelength conversion member and a light emitting element. By incorporating the above-described fluoride phosphor-containing wavelength conversion member, the light emitting device may be configured to emit light having prescribed chromaticity coordinates while reducing the amount of the fluoride phosphor to be used. One example of the configuration of the light emitting device is that of the light emitting device disclosed in Japanese Laid-Open Patent Publication No. 2019-186537 (corresponding to U.S. Ser. No. 10/608,149) and the like.

The light emitting element may have an emission peak wavelength in a range of 380 nm to 485 nm. The light emitting element may be an excitation light source that excites the fluoride phosphor, and the fluoride phosphor is easily excited when the light emitting element has an emission peak intensity in the below-described range where the excitation intensity of the fluoride phosphor is relatively high. The light emitting element has an emission peak wavelength preferably in a range of 380 nm to 480 nm, more preferably in a range of 410 nm to 480 nm, still more preferably in a range of 430 nm to 480 nm. As the light emitting element used as an excitation light source, it is preferred to use a semiconductor light emitting element. By using a semiconductor light emitting element as an excitation light source, a light emitting device which not only has a high efficiency and a high input-output linearity but also is strong and stable against mechanical impact may be obtained. As the semiconductor light emitting element, for example, a semiconductor light emitting element containing a nitride-based semiconductor may be used. In an emission spectrum of the light emitting element, the half-value width of an emission peak is preferably, for example, 30 nm or less.

The light emitting device includes, for example: a light emitting element arranged on a substrate; and a wavelength conversion member that converts the wavelength of a part of light emitted from the light emitting element and releases the thus wavelength-converted light to the outside. The light emitted from the light emitting device is a mixed-color light composed of the light emitted from the light emitting element and the wavelength-converted light released from the wavelength conversion member.

EXAMPLES

The present invention will now be described more concretely by way of Examples; however, the present invention is not limited to the below-described Examples.

For the fluoride phosphors obtained in the below-described Examples and Comparative Examples, the average particle size was measured using Fisher Sub-Sieve Sizer Model 95 manufactured by Thermo Fisher Scientific, Inc. In addition, the maximum particle size was determined as follows on a scanning electron microscope (SEM) image. An SEM image observed to contain at least about 500 particles of each fluoride phosphor was obtained at a magnification of ×250 with an accelerating voltage of 5 kV. Among these particles, for each of plural particles estimated to have a maximum particle size, a further enlarged SEM image was obtained. The magnification in this process was about ×5,000. Based on the scale of an SEM image that had been calibrated in advance, the maximum length was measured for each of these plural particles. Comparing the thus measured maximum particle lengths of the particles, the maximum length of a particle giving a largest value was defined as the maximum particle size of the fluoride particles. Further, the composition was analyzed by inductively-coupled plasma atomic emission spectrometry (ICP-AES).

Example 1a $K_2MnF_6$ was weighed in an amount of 916.3 g and dissolved in 12.0 L of a 55%-by-mass aqueous hydrofluoric acid solution to prepare a first solution. Further, $KHF_2$ was weighed in an amount of 7,029 g and dissolved in 23.5 L of a 55%-by-mass aqueous hydrofluoric acid solution to prepare a second solution. Subsequently, 15.5 L of an aqueous solution containing 40% by mass of $H_2SiF_6$ was prepared as a third solution. While stirring the second solution at room temperature, the first solution and the third solution were added dropwise thereto over a period of about 20 hours. After the completion of this dropwise addition, the resulting solution was washed by repeating several times an operation of adding 400 mL of a 35% hydrogen peroxide solution, adding 30 L of pure water, stirring and leaving the resultant to stand, and subsequently removing the resulting supernatant. The thus obtained precipitate was subjected to solid-liquid separation and then washed with ethanol and dried at 90° C. for 10 hours, whereby fluoride particles were produced.

In an atmosphere having a fluorine gas concentration of 20% by volume and a nitrogen gas concentration of 80% by volume, the thus obtained fluoride particles were heat-treated in contact with fluorine gas at a temperature of 500° C. and a retention time of 8 hours to produce a fluoride phosphor of Example 1a. It is noted here that the retention time in this heat treatment means an elapsed time until the termination of heating after the temperature reached the prescribed heat treatment temperature.

The thus obtained fluoride phosphor of Example 1a had an average particle size of 5.6 μm, a maximum particle size of 15.0 μm, and a composition represented by $K_2Si_{0.962}Mn_{0.038}F_6$.

Example 1b

While stirring 300 g of the fluoride phosphor of Example 1a in 900 g of a 0.12%-by-mass aqueous phosphoric acid solution, 180 g of a 1.5%-by-mass aqueous lanthanum nitrate solution was added dropwise over a period of about 1 minute to attach lanthanum phosphate to the surface of the fluoride phosphor, whereby a surface-treated fluoride phosphor of Example 1b was obtained. It is noted here that the amount of attached lanthanum phosphate was 1.9% by mass with respect to the amount of the fluoride phosphor.

The surface-treated fluoride phosphor of Example 1b had an average particle size of 5.2 μm and a maximum particle size of 13.6 μm.

Example 2a

Fluoride particles were obtained in the same manner as in Example 1, except that the amount of $K_2MnF_6$ was changed to 1,047.2 g and the amount of the 55%-by-mass aqueous hydrofluoric acid solution used in the second solution was changed to 28.5 L. The thus obtained fluoride particles had an average particle size of 9.0 μm and a composition represented by $K_2Si_{0.950}Mn_{0.050}F_6$.

The thus obtained fluoride particles were put into a cylindrical polypropylene bottle having a capacity of about 2,000 mL and containing 2,000 g of alumina balls of 1 mm in diameter, and pure water was added thereto until the whole amount of the alumina balls were immersed, after which a pulverization treatment was performed for 10 hours by wet ball milling. It is noted here that the amount of the added fluoride particles was 12.5% by mass of the alumina balls. The alumina balls were removed after the ball milling, and the thus obtained slurry of pulverized product was subjected to solid-liquid separation, washed with ethanol, and then dried at 90° C. for 10 hours, whereby a fluoride phosphor of Example 2a was obtained.

The thus obtained fluoride phosphor of Example 2a had an average particle size of 1.2 μm, a maximum particle size of 7.0 μm, and a composition represented by $K_2Si_{0.962}Mn_{0.038}F_6$.

Example 2b

For the pulverized fluoride phosphor of Example 2a, a surface treatment was performed in the same manner as in Example 1b, except that the concentration of the aqueous phosphoric acid solution was changed to 0.007% by mass and the concentration of the aqueous lanthanum nitrate solution was changed to 0.083% by mass, to obtain a fluoride phosphor of Example 2b in which lanthanum phosphate was attached in an amount of 0.2% by mass with respect to the amount of the fluoride phosphor.

The thus obtained surface-treated fluoride phosphor of Example 2b had an average particle size of 1.2 μm and a maximum particle size of 7.0 μm.

Example 3a

Fluoride particles were obtained in the same manner as in Example 1a, except that the amount of $K_2MnF_6$ was changed to 1,963.2 g, the amount of the 55%-by-mass aqueous hydrofluoric acid solution used in the first solution was changed to 15.5 L, the amount of the 55%-by-mass aqueous hydrofluoric acid solution used in the second solution was changed to 28.5 L, and the dropwise addition rate of the first solution was doubled. The thus obtained fluoride particles had an average particle size of 9.5 μm and a composition represented by $K_2Si_{0.906}Mn_{0.094}F_6$.

For the thus obtained fluoride particles, a pulverization treatment was performed in the same manner as in Example 2a to obtain a fluoride phosphor of Example 3a.

The thus obtained fluoride phosphor of Example 3a had an average particle size of 1.1 μm, a maximum particle size of 3.0 μm, and a composition represented by $K_2Si_{0.922}Mn_{0.078}F_6$.

Example 3b

For the pulverized fluoride phosphor of Example 3a, a surface treatment was performed in the same manner as in Example 2b to obtain a fluoride phosphor of Example 3b in which lanthanum phosphate was attached in an amount of 0.3% by mass with respect to the amount of the fluoride phosphor.

The thus obtained surface-treated fluoride phosphor of Example 3b had an average particle size of 1.1 μm and a maximum particle size of 5.0 μm.

Example 4a

Fluoride particles having a composition represented by $K_2Si_{0.957}Mn_{0.043}F_6$ were obtained in the same manner as in Example 1a, except that the amount of the 55%-by-mass aqueous hydrofluoric acid solution used in the second solution was changed to 28.5 L. The thus obtained fluoride particles were mixed with a fluoride having a composition represented by $K_3AlF_6$ to obtain a mixture. This mixing was performed such that the ratio of the number of moles of the fluoride was 0.009 with respect to the number of moles of the fluoride particles. The thus obtained mixture was heat-treated in an inert gas atmosphere having a nitrogen gas concentration of 100% by volume at a temperature of 700° C. and a retention time of 5 hours to obtain a first heat-treated product. The thus obtained first heat-treated product was thoroughly washed with a washing solution containing 1% by mass of hydrogen peroxide. In an atmosphere having a fluorine gas concentration of 20% by volume and a nitrogen gas concentration of 80% by volume, the thus washed first heat-treated product was heat-treated in contact with fluorine gas at a temperature of 500° C. and a retention time of 8 hours to obtain fluoride particles having the second composition.

The thus obtained fluoride particles having the second composition had an average particle size of 10.4 μm, a maximum particle size of 15.2 μm, and a composition represented by $K_2Si_{0.956}Al_{0.007}Mn_{0.037}F_{5.992}$.

For the thus obtained fluoride particles having the second composition, a pulverization treatment was performed in the same manner as in Example 2a to obtain a fluoride phosphor of Example 4a.

The thus obtained fluoride phosphor of Example 4a had an average particle size of 1.3 μm, and a maximum particle size of 4.2 μm.

Example 4b

For the pulverized fluoride phosphor of Example 4a, a surface treatment was performed in the same manner as in Example 1b to obtain a fluoride phosphor of Example 4b in which lanthanum phosphate was attached in an amount of 0.2% by mass with respect to the amount of the fluoride phosphor.

The thus obtained surface-treated fluoride phosphor of Example 4b had an average particle size of 1.3 μm and a maximum particle size of 7.0 μm.

Comparative Example 1a

A fluoride phosphor of Comparative Example 1a was obtained in the same manner as in Example 1a, except that the amount of $K_2MnF_6$ was changed to 850.9 g and the amount of the 55%-by-mass aqueous hydrofluoric acid solution used in the second solution was changed to 28.5 L.

The thus obtained fluoride phosphor of Comparative Example 1a had an average particle size of 8.9 μm, a maximum particle size of 26.0 μm, and a composition represented by $K_2Si_{0.961}Mn_{0.039}F_6$.

Comparative Example 1b

For the thus obtained fluoride phosphor of Comparative Example 1a, a surface treatment was performed in the same manner as in Example 1b, except that the concentration of the aqueous phosphoric acid solution was changed to 0.24% by mass and the concentration of the aqueous lanthanum nitrate solution was changed to 3.0% by mass, to obtain a fluoride phosphor of Comparative Example 1b in which lanthanum phosphate was attached in an amount of 2.5% by mass with respect to the amount of the fluoride phosphor.

The thus obtained surface-treated fluoride phosphor had an average particle size of 7.5 μm and a maximum particle size of 24.6 μm.

Comparative Example 2a

The fluoride particles obtained in Example 4a, which had the second composition and had not been pulverized, were used as a fluoride phosphor of Comparative Example 2a.

Comparative Example 2b

For the fluoride phosphor of Comparative Example 2a, a surface treatment was performed in the same manner as in Comparative Example 1b to obtain a fluoride phosphor of Comparative Example 2b in which lanthanum phosphate was attached in an amount of 0.5% by mass with respect to the amount of the fluoride phosphor.

The thus obtained surface-treated fluoride phosphor of Comparative Example 2b had an average particle size of 10.4 μm and a maximum particle size of 18.6 μm.

Example 5a $K_2MnF_6$ was weighed in an amount of 916.3 g and dissolved in 12.0 L of a 55%-by-mass aqueous hydrofluoric acid solution to prepare a first solution. Further, $KHF_2$ was weighed in an amount of 7,029 g and dissolved in 23.5 L of a 55%-by-mass aqueous hydrofluoric acid solution to prepare a second solution. Subsequently, 15.5 L of an aqueous solution containing 40% by mass of $H_2SiF_6$ was prepared as a third solution. While stirring the second solution at room temperature, the first solution and the third solution were added dropwise thereto over a period of about 20 hours. After the completion of this dropwise addition, the resulting solution was washed by repeating several times an operation of adding 400 mL of a 35% hydrogen peroxide solution, adding 30 L of pure water, stirring and leaving the resultant to stand, and subsequently removing the resulting supernatant. The thus obtained precipitate was subjected to solid-liquid separation and then washed with ethanol and dried at 90° C. for 10 hours, whereby fluoride particles were produced.

In an atmosphere having a fluorine gas concentration of 20% by volume and a nitrogen gas concentration of 80% by volume, the thus obtained fluoride particles were heat-treated in contact with fluorine gas at a temperature of 500° C. and a retention time of 8 hours to produce a fluoride phosphor of Example 5a. It is noted here that the retention time in this heat treatment means an elapsed time until the termination of heating after the temperature reached the prescribed heat treatment temperature.

The thus obtained fluoride phosphor of Example 5a had an average particle size of 5.6 μm, a maximum particle size of 15.0 μm, and a composition represented by $K_2Si_{0.961}Mn_{0.039}F_6$.

Example 5b

While stirring 300 g of the fluoride phosphor of Example 5a in 900 g of a 0.12%-by-mass aqueous phosphoric acid solution, 180 g of a 1.5%-by-mass aqueous lanthanum nitrate solution was added dropwise over a period of about 1 minute to attach lanthanum phosphate to the surface of the fluoride phosphor, whereby a surface-treated fluoride phosphor of Example 5b was obtained. It is noted here that the amount of attached lanthanum phosphate was 1.9% by mass with respect to the amount of the fluoride phosphor.

The surface-treated fluoride phosphor of Example 5b had an average particle size of 5.2 μm and a maximum particle size of 13.6 μm.

Example 6a

Fluoride particles were obtained in the same manner as in Example 5a, except that the amount of $K_2MnF_6$ was changed to 1,047.2 g and the amount of the 55%-by-mass aqueous hydrofluoric acid solution used in the second solution was changed to 28.5 L. The thus obtained fluoride particles had an average particle size of 8.3 μm and a composition represented by $K_2Si_{0.949}Mn_{0.051}F_6$.

The thus obtained fluoride particles were put into a cylindrical polypropylene bottle having a capacity of about 2,000 mL and containing 2,000 g of alumina balls of 1 mm in diameter, and pure water was added thereto until the whole amount of the alumina balls were immersed, after which a pulverization treatment was performed for 10 hours by wet ball milling. It is noted here that the amount of the added fluoride particles was 12.5% by mass of the alumina balls. The alumina balls were removed after the ball milling, and the thus obtained slurry of pulverized product was subjected to solid-liquid separation, washed with ethanol, and then dried at 90° C. for 10 hours, whereby a fluoride phosphor of Example 6a was obtained.

The thus obtained fluoride phosphor of Example 6a had an average particle size of 1.2 μm, a maximum particle size of 7.0 μm, and a composition represented by $K_2Si_{0.961}Mn_{0.039}F_6$.

Example 6b

For the pulverized fluoride phosphor of Example 6a, a surface treatment was performed in the same manner as in Example 5b, except that the concentration of the aqueous phosphoric acid solution was changed to 0.007% by mass and the concentration of the aqueous lanthanum nitrate solution was changed to 0.083% by mass, to obtain a fluoride phosphor of Example 6b in which lanthanum phosphate was attached in an amount of 0.2% by mass with respect to the amount of the fluoride phosphor.

The thus obtained surface-treated fluoride phosphor of Example 6b had an average particle size of 1.2 μm and a maximum particle size of 7.0 μm.

Example 7a

Fluoride particles were obtained in the same manner as in Example 5a, except that the amount of $K_2MnF_6$ was changed to 1,963.2 g, the amount of the 55%-by-mass aqueous hydrofluoric acid solution used in the first solution was changed to 15.5 L, the amount of the 55%-by-mass aqueous hydrofluoric acid solution used in the second solution was changed to 28.5 L, and the dropwise addition rate of the first solution was doubled. The thus obtained fluoride particles had an average particle size of 9.5 μm and a composition represented by $K_2Si_{0.902}Mn_{0.098}F_6$.

For the thus obtained fluoride particles, a pulverization treatment was performed in the same manner as in Example 6a to obtain a fluoride phosphor of Example 7a.

The thus obtained fluoride phosphor of Example 7a had an average particle size of 1.1 μm, a maximum particle size of 3.0 μm, and a composition represented by $K_2Si_{0.920}Mn_{0.080}F_6$.

Example 7b

For the pulverized fluoride phosphor of Example 7a, a surface treatment was performed in the same manner as in Example 6b to obtain a fluoride phosphor of Example 7b in which lanthanum phosphate was attached in an amount of 0.3% by mass with respect to the amount of the fluoride phosphor.

The thus obtained surface-treated fluoride phosphor of Example 7b had an average particle size of 1.1 μm and a maximum particle size of 5.0 μm.

Example 8a

Fluoride particles having a composition represented by $K_2Si_{0.955}Mn_{0.045}F_6$ were obtained in the same manner as in Example 5a, except that the amount of the 55%-by-mass aqueous hydrofluoric acid solution used in the second solution was changed to 28.5 L. The thus obtained fluoride particles were mixed with a fluoride having a composition represented by $K_3AlF_6$ to obtain a mixture. This mixing was performed such that the ratio of the number of moles of the fluoride was 0.009 with respect to the number of moles of the fluoride particles. The thus obtained mixture was heat-treated in an inert gas atmosphere having a nitrogen gas concentration of 100% by volume at a temperature of 700° C. and a retention time of 5 hours to obtain a first heat-treated product. The thus obtained first heat-treated product was thoroughly washed with a washing solution containing 1% by mass of hydrogen peroxide. In an atmosphere having a fluorine gas concentration of 20% by volume and a nitrogen gas concentration of 80% by volume, the thus washed first heat-treated product was heat-treated in contact with fluorine gas at a temperature of 500° C. and a retention time of 8 hours to obtain fluoride particles having the second composition.

The thus obtained fluoride particles having the second composition had an average particle size of 10.4 μm, a maximum particle size of 15.2 μm, and a composition represented by $K_2Si_{0.955}Al_{0.007}Mn_{0.038}F_{5.993}$.

For the thus obtained fluoride particles having the second composition, a pulverization treatment was performed in the same manner as in Example 6a to obtain a fluoride phosphor of Example 8a.

The thus obtained fluoride phosphor of Example 8a had an average particle size of 1.3 μm, and a maximum particle size of 4.2 μm.

Example 8b

For the pulverized fluoride phosphor of Example 8a, a surface treatment was performed in the same manner as in Example 6b to obtain a fluoride phosphor of Example 8b in which lanthanum phosphate was attached in an amount of 0.2% by mass with respect to the amount of the fluoride phosphor.

The thus obtained surface-treated fluoride phosphor of Example 8b had an average particle size of 1.3 μm and a maximum particle size of 7.0 μm.

Example 9a

Fluoride particles having a composition represented by $K_2Si_{0.948}Mn_{0.052}F_6$ were obtained in the same manner as in Example 5a, except that the amount of $K_2MnF_6$ was changed to 458.2 g, the amount of the 55%-by-mass aqueous hydrofluoric acid solution used in the first solution was changed to 6.0 L, the amount of the 55%-by-mass aqueous hydrofluoric acid solution used in the second solution was changed to 20.0 L, and the amount of the aqueous solution containing 40% by mass of $H_2SiF_6$ was changed to 7.8 L in the third solution. The thus obtained fluoride particles A were mixed with a fluoride particles B having a composition represented by $K_3AlF_6$ to obtain a mixture. This mixing was performed such that the ratio of the number of moles of the fluoride particles B was 0.010 with respect to the number of moles of the fluoride particles A. The thus obtained mixture was heat-treated in an inert gas atmosphere having a nitrogen gas concentration of 100% by volume at a temperature of 700° C. and a retention time of 5 hours to obtain a first heat-treated product. The thus obtained first heat-treated product was thoroughly washed with a washing solution containing 1% by mass of hydrogen peroxide. In an atmosphere having a fluorine gas concentration of 20% by volume and a nitrogen gas concentration of 80% by volume, the thus washed first heat-treated product was heat-treated in contact with fluorine gas at a temperature of 500° C. and a retention time of 8 hours to obtain fluoride phosphor of Example 9a having the second composition.

The thus obtained fluoride phosphor of Example 9a had an average particle size of 6.2 μm, a maximum particle size of 10.0 μm, and a composition represented by $K_2Si_{0.954}Al_{0.009}Mn_{0.037}F_{5.991}$.

Example 9b

For the fluoride phosphor of Example 9a, a surface treatment was performed in the same manner as in Example 5b to obtain a fluoride phosphor of Example 9b in which lanthanum phosphate was attached in an amount of 2.3% by mass with respect to the amount of the fluoride phosphor.

The thus obtained surface-treated fluoride phosphor of Example 9b had an average particle size of 5.9 μm and a maximum particle size of 13.0 μm.

Comparative Example 3a

A fluoride phosphor of Comparative Example 3a was obtained in the same manner as in Example 5a, except that the amount of $K_2MnF_6$ was changed to 850.9 g and the amount of the 55%-by-mass aqueous hydrofluoric acid solution used in the second solution was changed to 28.5 L.

The thus obtained fluoride phosphor of Comparative Example 3a had an average particle size of 8.9 μm, a maximum particle size of 26.0 μm, and a composition represented by $K_2Si_{0.960}Mn_{0.040}F_6$.

Comparative Example 3b

For the thus obtained fluoride phosphor of Comparative Example 3a, a surface treatment was performed in the same manner as in Example 5b, except that the concentration of the aqueous phosphoric acid solution was changed to 0.24% by mass and the concentration of the aqueous lanthanum nitrate solution was changed to 3.0% by mass, to obtain a fluoride phosphor of Comparative Example 3b in which lanthanum phosphate was attached in an amount of 2.3% by mass with respect to the amount of the fluoride phosphor.

The thus obtained surface-treated fluoride phosphor had an average particle size of 7.5 μm and a maximum particle size of 24.6 μm.

Comparative Example 4a

The fluoride particles obtained in Example 8a, which had the second composition and had not been pulverized, were used as a fluoride phosphor of Comparative Example 4a.

Comparative Example 4b

For the fluoride phosphor of Comparative Example 4a, a surface treatment was performed in the same manner as in Comparative Example 3b to obtain a fluoride phosphor of Comparative Example 4b in which lanthanum phosphate was attached in an amount of 0.5% by mass with respect to the amount of the fluoride phosphor.

The thus obtained surface-treated fluoride phosphor of Comparative Example 4b had an average particle size of 10.4 μm and a maximum particle size of 18.6 μm.

Evaluation of Mn Content

For each of the fluoride phosphors of Examples and Comparative Examples that had not been surface-treated, the composition was analyzed by inductively-coupled plasma atomic emission spectrometry (ICP-AES) to measure the Mn content and determine the Mn molar ratio (variable b) or (variable e) per 1 mole of the composition represented by the following Formula (1a) or (1b). The results thereof are shown in Table 1.

$$K_2[M^1{}_{1-b}Mn_bF_d] \quad (1a)$$

$$K_2[M^2{}_{1-e}Mn_eF_g] \quad (1b)$$

Powder Brightness

With regard to powders of the above-obtained fluoride phosphors, using a spectrofluorometer (QE-2000, manufactured by Otsuka Electronics Co., Ltd.), each fluoride phosphor was irradiated with an excitation light having an emission peak wavelength of 450 nm to measure the emission spectrum of the fluoride phosphor at room temperature (25° C.). From the data of the emission spectrum measured for each fluoride phosphor of Examples and Comparative Examples, the emission brightness was calculated for the fluoride phosphors of Examples 1a to 4a and Comparative Example 2a and Examples 1b to 4b and Comparative Example 2b as relative brightness values, taking the emission brightness of the fluoride phosphor obtained in Comparative Example 1a or 1b as 100%. The emission brightness was calculated for the fluoride phosphors of Examples 5a to 9a and Comparative Example 4a and Examples 5b to 9b and Comparative Example 4b as relative brightness values, taking the emission brightness of the fluoride phosphor obtained in Comparative Example 3a or 3b as 100%. The results thereof are shown in Tables 1 to 4.

SEM Images

Figure 3:
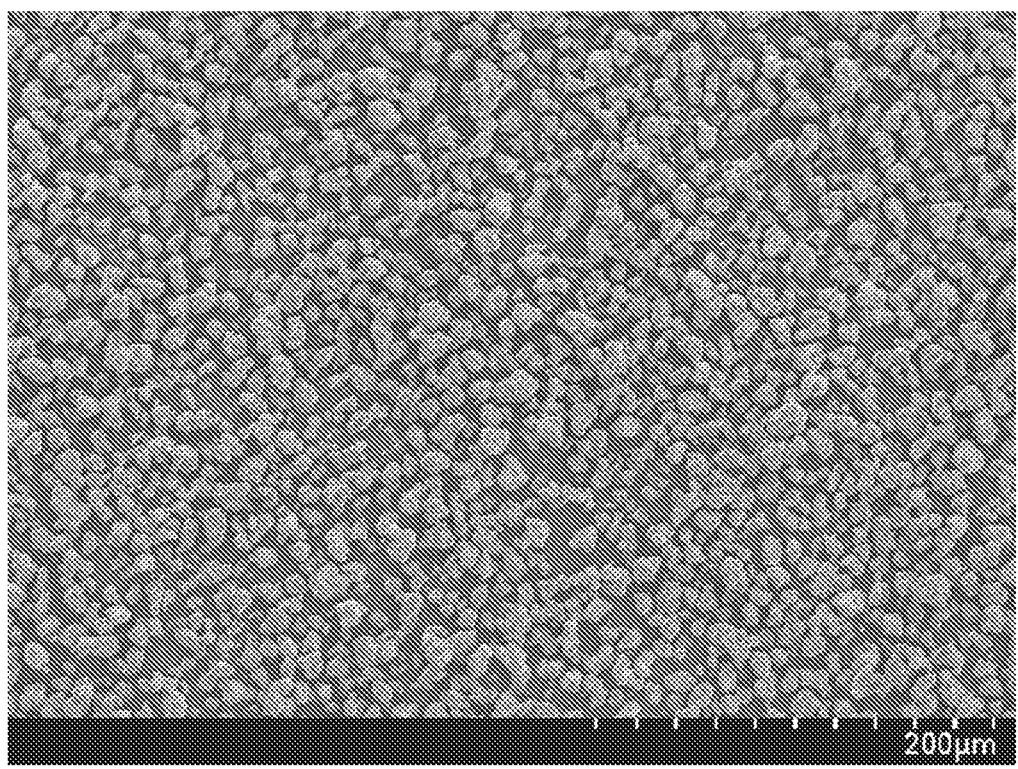
FIG. 3 is an exemplary SEM image of the fluoride phosphor according to Comparative Example 1b.
Figure 4:
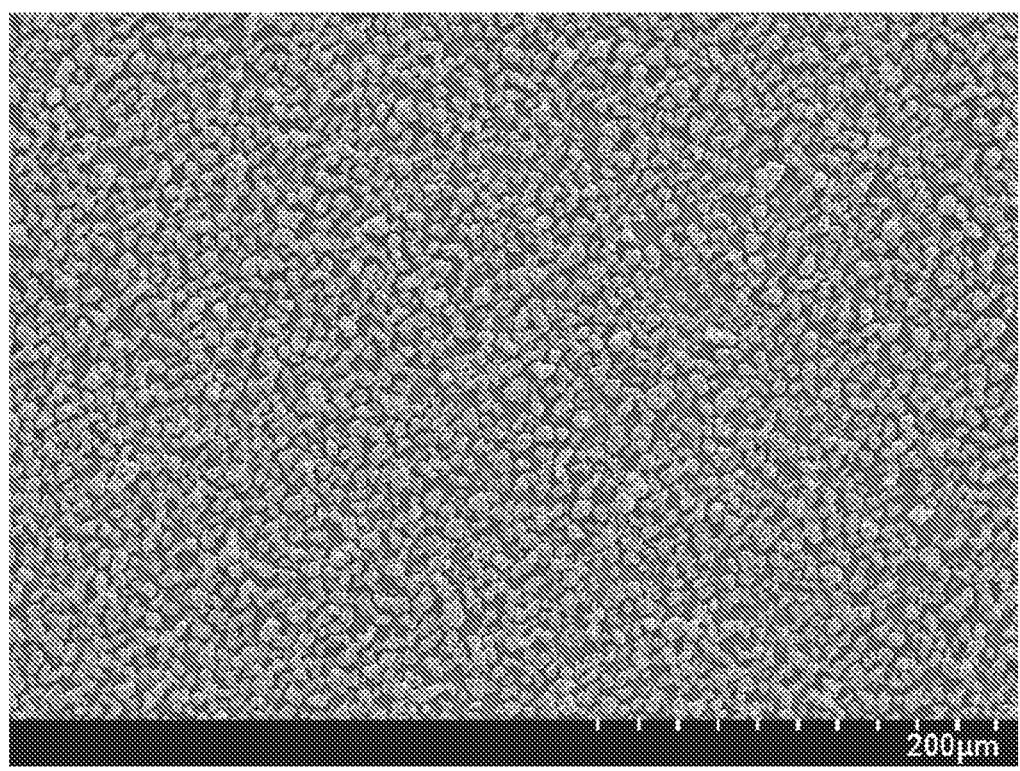
FIG. 4 is an exemplary SEM image of the fluoride phosphor according to Example 1b.
Figure 5:
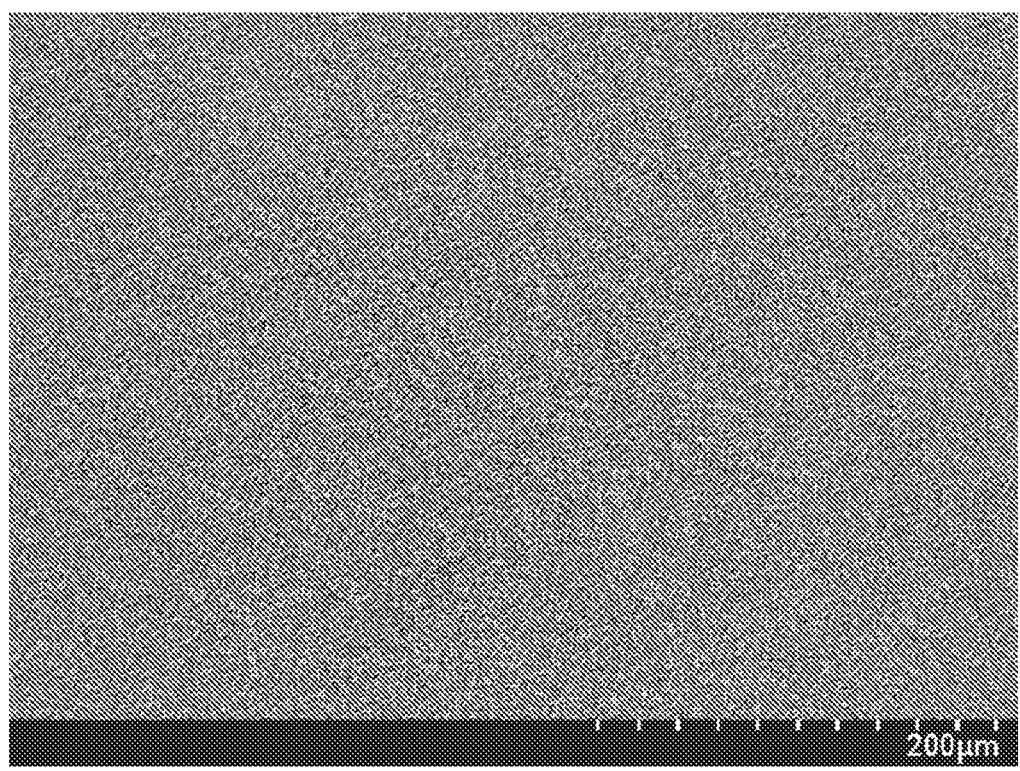
FIG. 5 is an exemplary SEM image of the fluoride phosphor according to Example 2b.

SEM images of fluoride phosphors were obtained under a scanning electron microscope (SEM). FIG. 1 shows an SEM image that illustrates a method of measuring the maximum length of a fluoride particle, and FIG. 2 shows an enlarged SEM image that illustrates a method of measuring the maximum length of a fluoride particle. Further, FIG. 3 shows an SEM image of the fluoride phosphor obtained in Comparative Example 1b, FIG. 4 shows an SEM image of the fluoride phosphor obtained in Example 1b, and FIG. 5 shows an SEM image of the fluoride phosphor obtained in Example 2b.

TABLE 1

| | Mn molar ratio | Average particle size (μm) | Maximum particle size (μm) | Maximum particle size/ Average particle size | Relative brightness (%) |
|---|---|---|---|---|---|
| Example 1a | 0.038 | 5.6 | 15.0 | 2.68 | 83.6 |
| Example 2a | 0.038 | 1.2 | 7.0 | 5.83 | 54.6 |
| Example 3a | 0.078 | 1.1 | 3.0 | 2.73 | 63.3 |
| Comparative Example 1a | 0.039 | 8.9 | 26.0 | 2.92 | 100.0 |
| Example 4a | 0.031 | 1.3 | 4.2 | 3.23 | 51.7 |
| Comparative Example 2a | 0.037 | 10.4 | 15.2 | 1.46 | 99.7 |

TABLE 2

| | Mn molar ratio | Average particle size (μm) | Maximum particle size (μm) | Maximum particle size/ Average particle size | Relative brightness (%) |
|---|---|---|---|---|---|
| Example 5a | 0.039 | 5.6 | 15.0 | 2.68 | 83.6 |
| Example 6a | 0.039 | 1.2 | 7.0 | 5.83 | 54.6 |
| Example 7a | 0.080 | 1.1 | 3.0 | 2.73 | 63.3 |
| Comparative Example 3a | 0.040 | 8.9 | 26.0 | 2.92 | 100.0 |
| Example 8a | 0.032 | 1.3 | 4.2 | 3.23 | 51.7 |
| Example 9a | 0.037 | 6.2 | 10.0 | 1.61 | 84.2 |
| Comparative Example 4a | 0.037 | 10.4 | 15.2 | 1.46 | 99.7 |

TABLE 3

| | Average particle size (μm) | Maximum particle size (μm) | Maximum particle size/ Average particle size | Relative brightness (%) |
|---|---|---|---|---|
| Example 1b | 5.2 | 13.6 | 2.62 | 88.2 |
| Example 2b | 1.2 | 7.0 | 5.83 | 58.3 |
| Example 3b | 1.1 | 5.0 | 4.55 | 67.8 |
| Comparative Example 1b | 7.5 | 24.6 | 3.28 | 100.0 |
| Example 4b | 1.3 | 7.0 | 5.38 | 55.7 |
| Comparative Example 2b | 10.4 | 18.6 | 1.79 | 106.6 |

TABLE 4

| | Average particle size (μm) | Maximum particle size (μm) | Maximum particle size/ Average particle size | Relative brightness (%) |
|---|---|---|---|---|
| Example 5b | 5.2 | 13.6 | 2.62 | 88.2 |
| Example 6b | 1.2 | 7.0 | 5.83 | 58.3 |
| Example 7b | 1.1 | 5.0 | 4.55 | 67.8 |
| Comparative Example 3b | 7.5 | 24.6 | 3.28 | 100.0 |
| Example 8b | 1.3 | 7.0 | 5.38 | 55.7 |
| Example 9b | 5.9 | 13.0 | 2.20 | 91.1 |
| Comparative Example 4b | 10.4 | 18.6 | 1.79 | 106.6 |

Each of the above-obtained surface-treated fluoride phosphors was mixed with 182 parts by mass of an acrylic resin raw material and a photopolymerization initiator to prepare a composition. The thus obtained composition was applied to a 50 μm-thick polyethylene terephthalate film to form a composition layer, and another same film was disposed on this composition layer. Subsequently, the resultant was irradiated with UV light to polymerize and cure the acrylic resin raw material. As a result, a wavelength conversion member having a total thickness of 180 μm, which contained the fluoride phosphor and the cured resin and in which a 80 μm-thick sheet-form wavelength conversion layer was sandwiched between two polyethylene terephthalate films, was obtained. It is noted here that, in the preparation of the composition, the amount of the fluoride phosphor to be used was adjusted such that the x value of CIE chromaticity coordinates of light emitted from a light emitting device provided with the resulting wavelength conversion member would be about 0.24. Table 3 shows the amount of each fluoride phosphor that was used. In Table 3, for example, a light emitting device in which the fluoride phosphor of Example 1b was used is indicated as a light emitting device of Example 1, and this also applies to other Examples and Comparative Examples in the same manner. The amount of each fluoride phosphor of Examples 1 to 4 and Comparative Example 2 that was used represents a relative value, taking the amount used in Comparative Example 1 as 100 parts by mass. The amount of each fluoride phosphor of Examples 5 to 9 and Comparative Example 4 that was used represents a relative value, taking the amount used in Comparative Example 3 as 100 parts by mass.

A light emitting device was produced by arranging a blue LED (emission peak wavelength: 450 nm), which is a semiconductor light emitting element, under the above-obtained wavelength conversion member. For the thus obtained light emitting device, the brightness was measured using a spectrophotometer. The brightness of the light emitting device of Examples 1 to 4 and Comparative Example 2 was defined as relative brightness (%), taking the brightness of the light emitting device of Comparative Example 1 as 100%. The brightness of the light emitting device of Examples 5 to 9 and Comparative Example 4 was defined as relative brightness (%), taking the brightness of the light emitting device of Comparative Example 3 as 100%. The results thereof are shown in Table 3.

TABLE 5

| | Rerative amount of phosphor (mass part) | Rerative brightness (%) |
|---|---|---|
| Example 1 | 91 | 98 |
| Example 2 | 75 | 93 |
| Example 3 | 35 | 94 |
| Comparative Example 1 | 100 | 100 |
| Example 4 | 92 | 95 |
| Comparative Example 2 | 102 | 100 |

TABLE 6

| | Rerative amount of phosphor (mass part) | Rerative brightness (%) |
|---|---|---|
| Example 5 | 91 | 98 |
| Example 6 | 75 | 93 |
| Example 7 | 35 | 94 |
| Comparative Example 3 | 100 | 100 |
| Example 8 | 92 | 95 |
| Example 9 | 91 | 93 |
| Comparative Example 4 | 102 | 100 |

By using the fluoride phosphor of Example 1b or 2b, the amount of a phosphor to be used was reduced as compared to using the fluoride phosphor of Comparative Example 1b. In Example 3b, the amount of a fluoride phosphor to be used was further reduced than in Example 2b. By using the fluoride phosphor of Example 4b, the amount of a phosphor to be used was reduced as compared to using the fluoride phosphor of Comparative Example 2b. Moreover, a relative brightness of 90% or higher was maintained even when the phosphor particles had a smaller particle size than in Comparative Examples. A reduction in the average particle size and the maximum particle size resulted in a reduction in the brightness as powder by as much as about 40% in Examples as compared to Comparative Examples; however, it is seen that, when the respective fluoride phosphors were incorporated into a light emitting device, a reduction in the brightness was limited to about 7% at the most in Examples as compared to Comparative Examples.

By using the fluoride phosphor of Example 5b or 6b, the amount of a phosphor to be used was reduced as compared to using the fluoride phosphor of Comparative Example 3b. In Example 7b, the amount of a fluoride phosphor to be used was further reduced than in Example 6b. By using the fluoride phosphor of Example 8b, the amount of a phosphor to be used was reduced as compared to using the fluoride phosphor of Comparative Example 4b. Moreover, a relative brightness of 90% or higher was maintained even when the phosphor particles had a smaller particle size than in Comparative Examples. A reduction in the average particle size and the maximum particle size resulted in a reduction in the brightness as powder by as much as about 40% in Examples as compared to Comparative Examples; however, it is seen that, when the respective fluoride phosphors were incorporated into a light emitting device, a reduction in the brightness was limited to about 7% at the most in Examples as compared to Comparative Examples.

The fluoride phosphor according to the present disclosure may be suitably applied to, for example, light sources for illumination, LED displays, liquid-crystal backlight applications and the like, as well as signals, illuminated switches, various sensors and indicators, and small strobes, especially in those light emitting devices in which a light-emitting diode is used as an excitation light source.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

Although the present disclosure has been described with reference to several exemplary embodiments, it is to be understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular examples, means, and embodiments, the disclosure may be not intended to be limited to the particulars disclosed; rather the disclosure extends to all functionally equivalent structures, methods, and uses such as are within the scope of the appended claims.

One or more examples or embodiments of the disclosure may be referred to herein, individually and/or collectively, by the term "disclosure" merely for convenience and without intending to voluntarily limit the scope of this application to any particular disclosure or inventive concept. Moreover, although specific examples and embodiments have been illustrated and described herein, it should be appreciated that any subsequent arrangement designed to achieve the same or similar purpose may be substituted for the specific examples or embodiments shown. This disclosure may be intended to cover any and all subsequent adaptations or variations of various examples and embodiments. Combinations of the above examples and embodiments, and other examples and embodiments not specifically described herein, will be apparent to those of skill in the art upon reviewing the description.

In addition, in the foregoing Detailed Description, various features may be grouped together or described in a single embodiment for the purpose of streamlining the disclosure. This disclosure may be not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter shall be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure may be determined by the broadest permissible interpretation of the following claims and their equivalents, and shall not be restricted or limited by the foregoing detailed description.

All publications, patent applications, and technical standards mentioned in this specification are herein incorporated by reference to the same extent as if each individual publication, patent application, or technical standard was specifically and individually indicated to be incorporated by reference.

What is claimed is:

1. A fluoride phosphor, comprising fluoride particles which have an average particle size of 0.5 μm or more and 3 μm or less and a maximum particle size of 1 μm or more and 18 μm or less, wherein a ratio of the maximum particle size with respect to the average particle size is higher than 1,
wherein the fluoride particles have a composition comprising: an element M containing at least one selected from the group consisting of Group 4 elements, Group 13 elements, and Group 14 elements; an alkali metal; Mn; and F, wherein, when the number of moles of the alkali metal in the composition is 2, the number of moles of Mn in the composition is more than 0 and less than 0.2, the number of moles of the element M in the composition is more than 0.8 and less than 1, and the number of moles of F in the composition is more than 5 and less than 7.

2. The fluoride phosphor according to claim 1, wherein an inorganic substance other than the fluoride particles is attached to at least part of a surface of the fluoride particles.

3. The fluoride phosphor according to claim 2, wherein the inorganic substance comprises at least one selected from the group consisting of: oxides containing at least one selected from the group consisting of Si, Al, Ti, Zr, Sn, and Zn; and rare earth phosphates containing at least one selected from the group consisting of La, Ce, Dy, and Gd.

4. The fluoride phosphor according to claim 1, wherein the fluoride particles have a composition comprising at least one of Si and Ge as the element M, and wherein, when the number of moles of the alkali metal in the composition is 2, a total number of moles of Si, Ge, and Mn in the composition is 0.9 or more and 1.1 or less.

5. The fluoride phosphor according to claim 1, wherein the fluoride particles have the composition represented by the following Formula (1):

$$A^1_c[M^1_{1-b}Mn_bF_d] \qquad (1)$$

wherein, $A^1$ contains at least one selected from the group consisting of Li, Na, K, Rb, and Cs; $M^1$ contains at least one of Si and Ge, and optionally further contains at least one element selected from the group consisting of Group 4 elements and Group 14 elements; b satisfies 0<b<0.2; c represents an absolute value of the charge of $[M^1_{1-b}Mn_bF_d]$ ion; and d satisfies 5<d<7.

6. The fluoride phosphor according to claim 1, wherein the fluoride particles have a composition comprising Si and Al as the element M, and wherein, when the number of moles of the alkali metal in the composition is 2, a total number of moles of Si, Al, and Mn in the composition is 0.9 or more and 1.1 or less, and a number of moles of Al in the composition is more than 0 and 0.1 or less.

7. The fluoride phosphor according to claim 1, wherein the fluoride particles have the composition represented by the following Formula (2):

$$A^2_f[M^2_{1-e}Mn_eF_g] \qquad (2)$$

wherein, $A^2$ contains at least one selected from the group consisting of Li, Na, K, Rb, and Cs; $M^2$ contains at least Si and Al, and optionally further contains at least one element selected from the group consisting of Group 4 elements, Group 13 elements, and Group 14 elements; e satisfies 0<e<0.2; f represents an absolute value of the charge of $[M^2_{1-e}Mn_eF_g]$ ion; and g satisfies 5<g<7.

8. A wavelength conversion layer, comprising the fluoride phosphor according to claim 1; and a resin.

9. The wavelength conversion layer according to claim 8, wherein the wavelength conversion layer has an average thickness of 20 μm or more and 100 μm or less.

10. A light emitting device, comprising:
a wavelength conversion member comprising the wavelength conversion layer according to claim 8; and
a light emitting element having an emission peak wavelength in a range of 380 nm or more and 485 nm or less.

11. A method of producing a fluoride phosphor, the method comprising:
preparing first fluoride particles having an average particle size of 5 μm or more and 30 μm or less; and
performing a pulverization treatment of the first fluoride particles to obtain second fluoride particles having an average particle size of 0.1 μm or more and 7 μm or less and a maximum particle size of 1 μm or more and 18 μm or less, wherein a ratio of the maximum particle size with respect to the average particle size is higher than 1.

12. The method of producing a fluoride phosphor according to claim 11, the method further comprising performing a surface treatment of the second fluoride particles.

13. The method of producing a fluoride phosphor according to claim 12, wherein the surface treatment comprises bringing the second fluoride particles into contact with a metal alkoxide containing at least one selected from the group consisting of Si, Al, Ti, Zr, Sn, and Zn in a liquid medium to obtain first oxide-attached fluoride particles in which an oxide derived from the metal alkoxide is attached to at least part of a surface of the second fluoride particles.

14. The method of producing a fluoride phosphor according to claim 12, wherein the surface treatment comprises bringing the second fluoride particles into contact with a rare earth ion containing at least one selected from the group consisting of La, Ce, Dy, and Gd, as well as a phosphate ion to obtain rare earth phosphate-attached fluoride particles in which a rare earth phosphate is attached to at least part of a surface of the second fluoride particles.

15. The method of producing a fluoride phosphor according to claim 14, wherein the surface treatment further comprises bringing the rare earth phosphate-attached fluoride particles into contact with a metal alkoxide containing at least one selected from the group consisting of Si, Al, Ti, Zr, Sn, and Zn in a liquid medium to obtain second oxide-attached fluoride particles in which an oxide derived from the metal alkoxide is attached to at least part of a surface of the rare earth phosphate-attached fluoride particles.

* * * * *